US009373259B2

(12) United States Patent
Maitra et al.

(10) Patent No.: US 9,373,259 B2
(45) Date of Patent: Jun. 21, 2016

(54) SITUATION-AWARE MOBILE TRAVEL ADVISORY TO PUBLIC TRANSPORT COMMUTERS

(71) Applicant: Accenture Global Services Limited, Dublin (IR)

(72) Inventors: Anutosh Maitra, Bangalore (IN); Sanjoy Paul, Bangalore (IN); Saurabh Bhadkaria, Bangalore (IN); Venkatesh Subramanian, Bangalore (IN); Chiranjeeb Ghosh, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 176 days.

(21) Appl. No.: 14/085,290

(22) Filed: Nov. 20, 2013

(65) Prior Publication Data

US 2014/0142834 A1  May 22, 2014

(30) Foreign Application Priority Data

Nov. 20, 2012 (IN) ............................ 4836/CHE/2012

(51) Int. Cl.
*G06F 19/00* (2011.01)
*G08G 1/123* (2006.01)
(Continued)

(52) U.S. Cl.
CPC ............ *G08G 1/123* (2013.01); *G01C 21/3423* (2013.01); *G06Q 10/047* (2013.01); *G01C 21/26* (2013.01)

(58) Field of Classification Search
CPC .. G01C 21/26; G01C 21/3423; G06Q 10/047; G08G 1/123; B60R 2325/205

USPC .................................... 701/36, 117, 425, 428
See application file for complete search history.

(56) References Cited

U.S. PATENT DOCUMENTS

| 5,021,780 A | 6/1991 | Fabiano et al. |
| 6,700,506 B1 | 3/2004 | Winkler et al. |

(Continued)

FOREIGN PATENT DOCUMENTS

| EP | 2 280 385 A2 | 2/2011 |
| EP | 2 280 385 A3 | 5/2012 |

(Continued)

OTHER PUBLICATIONS

Extended European Search Report dated Jan. 31, 2014, for EP Patent Application No. 13 00 5455.

(Continued)

*Primary Examiner* — Gertrude Arthur Jeanglaude
(74) *Attorney, Agent, or Firm* — Harrity & Harrity, LLP

(57) ABSTRACT

A method for managing a public transport system comprises receiving information indicating a change of status of a component of a public transport system; identifying a commuter who is affected by the change of status; generating an alternative travel advisory for the commuter based on the change of status; and transmitting the alternative travel advisory to the commuter. In some embodiments the change of status includes a delay in an expected time of arrival of a public transport vehicle; identifying the commuter includes locating the commuter in the vehicle; and the alternative travel advisory includes a message advising the commuter to leave the vehicle. In some embodiments, locating the commuter in the vehicle is based on comparing a location of the commuter with a location of the vehicle. In some embodiments, the method further comprises receiving from the commuter information indicating that the commuter has boarded the vehicle.

43 Claims, 18 Drawing Sheets

(51) Int. Cl.
  *G01C 21/34*  (2006.01)
  *G06Q 10/04*  (2012.01)
  *G01C 21/26*  (2006.01)

(56) References Cited

U.S. PATENT DOCUMENTS

| | | | |
|---|---|---|---|
| 7,030,781 | B2 | 4/2006 | Jones |
| 7,394,403 | B2 | 7/2008 | Winkler et al. |
| 8,301,112 | B2 | 10/2012 | Morrison |
| 8,565,820 | B2 * | 10/2013 | Riemer et al. ............... 455/557 |
| 2006/0149461 | A1 | 7/2006 | Rowley et al. |
| 2007/0194940 | A1 | 8/2007 | Valluru |
| 2010/0318285 | A1 | 12/2010 | Kim et al. |
| 2011/0161001 | A1 | 6/2011 | Fink |
| 2011/0231091 | A1 | 9/2011 | Gourlay et al. |
| 2014/0012498 | A1 * | 1/2014 | Gustafson et al. ............ 701/468 |

FOREIGN PATENT DOCUMENTS

| | | |
|---|---|---|
| WO | WO 2012/034083 A2 | 3/2012 |
| WO | WO 2012/034083 A8 | 4/2012 |
| WO | WO 2012/034083 A3 | 8/2012 |

OTHER PUBLICATIONS

Alcatel-Lucent Integrated Communications for Highways ,"Integrated Communications for Highways: The Solution for Highway Operators," (8 pages). <www.alcatel-lucent.com>.

Alazab et al., "An Optimal Transportation Routing Approach using GIS-based Dynamic Traffic Flows," 2011 3rd International Conference on Information and Financial Engineering, IPEDR, vol. 12, pp. 172-178, 2011.

Balke et al., "A Situation-Aware Mobile Traffic Information System," Proceedings of the 36th Annual Hawaii International Conference on System Sciences, IEEE, pp. 1-10, 2003.

Bertolotto et al., "Bus Catcher: a Context Sensitive Prototype System for Public Transportation Users," Proceedings of the Third International Conference on Web Information Systems Engineering (Workshops), 2002, IEEE, pp. 64-72, 2002.

Delling et al., "Time-Dependent Route Planning," Robust and Online Large-Scale Optimization, LNCS, vol. 5868, pp. 207-230, 2009.

Department for Transport News Release (039) issued by The Government News Network on Mar. 4, 2008, "Better managed motorways and more funding to tackle urban congestion" (2 pages). <http://webarchive.nationalarchives.gov.uk/20120810121037/http://www.highways.gov.uk/news/pressrelease.aspx?pressreleaseid=158587>.

Directorate General for Energy and Transport, European Commission, "Traffic Management for Land Transport", Transport Research Knowledge Centre, 2009 (32 pages). <http://www.transport-research.info/Upload/Documents/200909/20090915_180031_11989_TRKC%20Traffic%20Management%20for%20Land%20Transport.pdf>.

Ferris et al., "OneBusAway: Behavioral and Satisfaction Changes Resulting from Providing Real-Time Arrival Information for Public Transit," Proceedings of the 2011 Transportation Research Board Annual Meeting, 2011 (15 pages).

Google Maps Transit (2 pages) <http://www.google.com/intl/en/landing/transit/#mdy>.

Litman, "Introduction to Multi-Modal Transportation Planning Principles and Practices Dec. 10, 2012," Victoria Transport Policy Institute (19 pages). <http://www.vtpi.org/multimodal_planning.pdf>.

Maitra et al., An Integrated Transport Advisory System for Commuters, Operators and City Control Centres, 2012 First International Workshop on Vehicular Traffic Management for Smart Cities (VTM), 2012, IEEE (3 pages).

Nokia Maps 3.06 (3 pages). <http://www.nokia.com/gb-en/support/product/nokia-maps-306/>.

Proctor et al. "Delivering SMS Journey Time Services," Highways Agency (Streetwise) i2TERN, 2007 (5 pages).

PRWeb, "iPhone App "Daily Commute" Gets Feature Updates Designed to Get Commuters to Work on Time with Less Stress," 2012 (3 pages). <http://www.prweb.com/releases/dailycommute/iphoneappupdate/prweb9859424.htm>.

SBS Transit Press Release Apr. 2012 "SBS Transit Launches Free Sms and iPhone Alert Service for Train Disruptions," (2 pages). <http://www.sbstransit.com.sg/press/2012-04-11-01.aspx>.

Tumas et al.,"Personalized Mobile City Transport Advisory System," Information and Communication Technologies in Tourism, pp. 173-184, 2009.

* cited by examiner

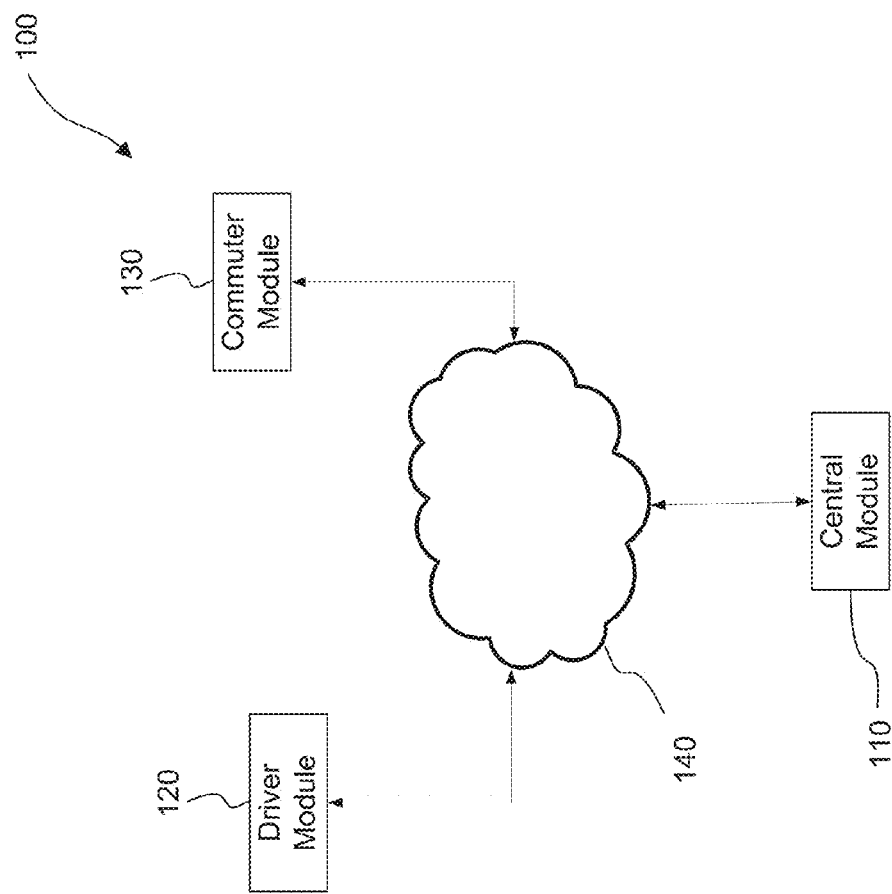

| ROUTES | Bus Stops | S1 | S2 | S3 | S4 | S5 | S6 | S7 | S8 | S9 | S10 | S11 | S12 | S13 |
|---|---|---|---|---|---|---|---|---|---|---|---|---|---|---|
| R1 | | 9:00 | 9:30 | | 10:30 | | | | 10:45 | | | | | 11:15 |
| | | 10:00 | 10:30 | | 11:30 | | | | 11:45 | | | | | 12:15 |
| | | 10:30 | 11:00 | | 12:00 | | | | 12:15 | | | | | 12:45 |
| R2 | | 9:05 | 9:35 | | 10:05 | | | | | 10:40 | | | | 11:25 |
| | | 9:45 | 10:15 | | 10:45 | | | | | 11:20 | | | | 12:05 |
| | | 10:45 | 11:15 | | 11:45 | | | | | 12:20 | | | | 13:05 |
| R3 | | 8:50 | | 9:25 | | 10:00 | | | | | | | | 11:40 |
| | | 9:45 | | 10:20 | | 10:55 | | | | | | | | 12:35 |
| | | 11:00 | | 11:35 | | 12:10 | | | | | | | | 13:50 |
| R4 | | 9:10 | 9:40 | | 10:10 | | 10:40 | 10:35 | 11:05 | | | | | 12:40 |
| | | 9:25 | 9:55 | | 10:25 | | 10:55 | 11:30 | 12:00 | | | | | 12:55 |
| | | 9:40 | 10:10 | | 10:40 | | 11:10 | 12:45 | 13:15 | | | | | 13:10 |
| R5 | | 9:55 | 10:25 | 10:40 | | 11:05 | | 11:30 | | | 11:10 | 11:40 | 12:55 | 13:25 |
| | | 10:15 | 10:45 | 11:00 | | 11:25 | | 11:50 | | | 11:25 | 11:55 | 13:15 | 13:45 |
| | | 10:25 | 10:55 | 11:10 | | 11:35 | | 12:00 | | | 11:40 | 12:10 | 13:25 | 13:55 |
| | | 10:45 | 11:15 | 11:30 | | 11:55 | | 12:20 | | | 11:55 | 12:25 | 12:55 | 14:15 |
| | | | | | | | | | | | 12:15 | 12:45 | 13:15 | |
| | | | | | | | | | | | 12:25 | 12:55 | 13:25 | |
| | | | | | | | | | | | 12:45 | 13:15 | 13:45 | |

SITUATION-AWARE MOBILE TRAVEL ADVISORY TO PUBLIC TRANSPORT COMMUTERS

CROSS-REFERENCE TO RELATED APPLICATIONS

This application claims the benefit of Indian Application No. 4836/CHE/2012, filed Nov. 20, 2012, which is herein incorporated by reference in its entirety.

TECHNICAL FIELD

The present disclosure relates generally to methods and systems for controlling public transport systems and more specifically to methods and systems for providing situation-aware mobile travel advisory to public transport commuters.

BACKGROUND

Modern cities are witnessing a rapid rise in the volume of transportation of goods and people. This rise regularly outpaces the growth of transport infrastructures such as roads, and thus stresses the commute network and creates traffic issues that tax the well-being of populations and economies. A widely accepted policy for addressing these problems is to convince more people to use public transport as the preferred way to commute. Success of such policies depends on whether the commuters can trust the public transport as a reliable means to reach their destinations. Shortcomings in the public transport may affect the commuters' trust in the transportation. Some of the common problems include irregularities in scheduling, waiting time at designated stops, and the commuter's inability to adjust a commute route in case of a forced departure from planned travel route.

With the advent of mobile devices, local transport schedules or maps in various electronic formats can be forwarded to the commuters' mobile devices. The transport schedules and maps, however, are static information that are not necessarily up to date and do not always adjust to the instant changes in the traffic flow. Disruptions, such as roadblocks or broken-down vehicles, for example, can delay a scheduled arrival or make a public transport route wholly unavailable. As a result, the commuter cannot rely on the static information for accurate planning.

Moreover, commuters often prefer mechanisms that customize the vast amount of information in the maps and schedules to the specific goals and preferences of the commuter. These goals and preferences may include the commuter's destination, schedule, preferred cost limits, or preferred comfort level. Commuters demand a reliable public transport mechanism that can get them to their destination on time, irrespective of the disruptions in the traffic flow, and in accordance with their preferences.

SUMMARY

In various embodiments a method for managing a public transport system comprises receiving, via a receiver module, information indicating a change of status of a component of a public transport system; identifying, by a locator module, a commuter who is affected by the change of status; generating, by an alternative travel advisory module, an alternative travel advisory for the commuter based on the change of status; and transmitting, by a transmitter module, the alternative travel advisory to the commuter.

In some embodiments, the change of status includes a delay in an expected time of arrival of a public transport vehicle; identifying the commuter includes locating the commuter in the vehicle; and the alternative travel advisory includes a message advising the commuter to leave the vehicle. In some embodiments, the method further comprises receiving from the commuter information indicating that the commuter has boarded the vehicle, wherein locating the commuter in the vehicle is based on the information. In some embodiments, the method further comprises tracking a location of the commuter; and tracking a location of the vehicle, wherein locating the commuter in the vehicle is based on comparing the location of the commuter with the location of the vehicle.

In some embodiments, the commuter is located in a first public transport vehicle, and the alternative travel advisory includes advising the commuter to leave the first public transport vehicle and board a second public transport vehicle. In some embodiments, the change of status comprises a delay in an expected time of arrival of a first public transport vehicle boarded by the commuter, and notification of the change of status is sent to the control center by at least one of an operator of the first vehicle or an operator of a second public transport vehicle different from the first vehicle.

In some embodiments, generating the alternative travel advisory is based on at least one of an expected time of arrival for the commuter or a preference of the commuter. In some embodiments, the change of status includes a traffic disruption, and identifying the commuter includes determining that the commuter has boarded a public transport vehicle for which a schedule is affected by the traffic disruption. In some embodiments, generating the alternative travel advisory comprises using a look-up table for a plurality of public transport vehicles. In some embodiments, the change of status includes a traffic disruption; and generating the alternative travel advisory comprises identifying an alternative public transport vehicle of the plurality of public transport vehicles, for which a schedule is not affected by the traffic disruption. In some embodiments, identifying the alternative public transport vehicle comprises determining that the alternative public transport vehicle has a stop located within a pre-determined distance from a location of the commuter.

In some embodiments, identifying the alternative public transport vehicle further comprises determining that the alternative public transport vehicle has a stop within a second pre-determined distance from a destination of the commuter. In some embodiments, transmitting the alternative travel advisory comprises transmitting the advisory to a mobile device. In some embodiments, the alternative travel advisory comprises a message identifying a preferred option for reaching a destination of the commuter and a second option for reaching the destination. In some embodiments, the alternative travel advisory comprises an identification a travel route that originates as a present location of the commuter and ends at a destination of the commuter. In some embodiments, the alternative travel advisory comprises a message directing the commuter to walk to a public transport stop and board a public transport vehicle at the public transport stop.

In some embodiments, the alternative travel advisory includes an advertisement. In some embodiments, the advertisement is based in part on a location of the commuter, a time of the transmitting the alternative travel advisory, a context of the commuter's commute, or a preference of the commuter.

In various embodiments an apparatus for guiding a public transport system comprises a communication network; and a public transport control center including a receiver module configured to receive information indicating a change of status of a component of the public transport system; a locator module configured to identify a commuter who is affected by the change of status; an alternative travel advisory module configured to generate an alternative travel advisory for the commuter based on the change of status; and a transmitter module configured to transmit the alternative travel advisory to the commuter via the communication network.

In various embodiments a non-transitory computer-readable medium stores instructions which, when executed by one or more processors, cause the one or more processors to perform a method for guiding a public transport system, the method comprising receiving, via a receiver module, information indicating a change of status of a component of a public transport system; identifying, by a locator module, a commuter who is affected by the change of status; generating, by an alternative travel advisory module, an alternative travel advisory for the commuter based on the change of status; and transmitting, by a transmitter module, the alternative travel advisory to the commuter.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings:

FIGS. 1A-1D are block diagrams for a public transport system according to some embodiments.

DETAILED DESCRIPTION

Figure 1B:
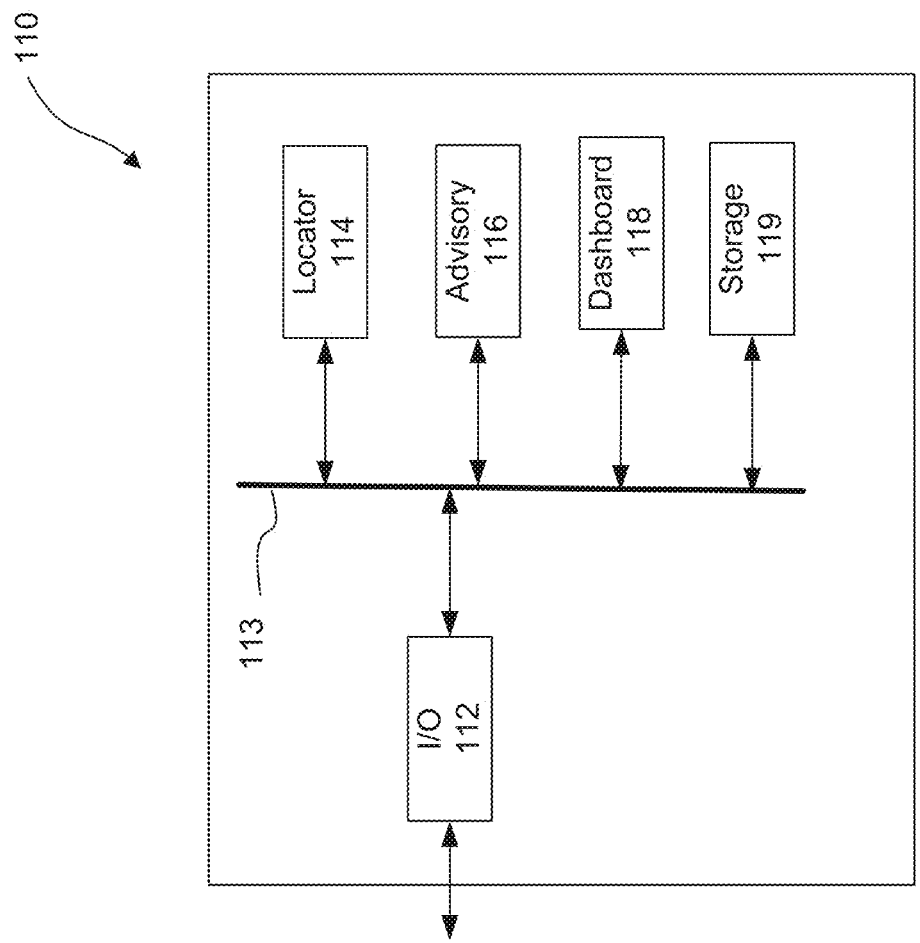

The following detailed description refers to the accompanying drawings. Wherever possible, the same reference numbers are used in the drawings and the description to refer to the same or similar parts. Also, similarly named elements may perform similar functions and may be similarly designed, unless specified otherwise. Numerous details are set forth to provide an understanding of the described embodiments. The embodiments may be practiced without these details. In other instances, well-known methods, procedures, and components have not been described in detail to avoid obscuring the described embodiments. While several exemplary embodiments and features are described here, modifications, adaptations, and other implementations may be possible, without departing from the spirit and scope of the invention. Accordingly, unless stated otherwise, the descriptions relate to one or more embodiments and should not be construed to limit the invention as a whole. Instead, the proper scope of the invention is defined by the appended claims.

Various embodiments may provide integrated solutions for controlling a public transport system and for delivering reliable travel plans to the commuters. The integrated solution may interact with various stakeholders, such as commuters, vehicle operators, and the central command authorities. FIGS. 1A-1D are block diagrams for a public transport system and its different components, and FIGS. 2A-2E show displays presented to different users of the system, as detailed below and according to various embodiments.

In various embodiments, different components of public transport system interact with different users of the system such as the control station, the vehicle driver, or the commuter. Moreover, in various embodiments, different components provide different views of the public transport system to the corresponding users. The different views may present the same or different information to the users indicating the status of the public transport. Some of the information in different views may be inter-related by, for example, reflecting a disruption in the transport system.

FIG. 1A is a block diagram of a public transport control system 100 according to some embodiments. In various embodiments, public transport control system 100 is part of a public transport system that further includes public transport vehicles. System 100 includes a public transport central module 110, a driver module 120, a commuter module 130, and a communication network 140.

Central module 110 is configured to monitor the public transport system and to issue travel advisories to commuters, as further detailed below. In some embodiments, central module 110 is installed in a central control station and is used by the central command authorities. In some embodiments, central module 110 is installed in a computer system located in the central control station.

Driver module 120 is configured to enable a driver of a public transport vehicle to interact with central module 110, as detailed below. In some embodiments, one or more driver modules 120 are installed in one or more public transport vehicles. The public transport vehicles can be, for example, public busses or public trains. In some embodiments, driver module 120 is installed in one or more computers located in the corresponding public transport vehicle.

Commuter module 130 is configured to enable a commuter of a public transport vehicle to interact with central module 110 or driver module 120, as detailed below. In some embodiments, one or more commuter modules 130 are installed in one or more mobile devices carried by the commuters. The mobile devices can be, for example, mobile phones or handheld devices customized for interacting with central module 110. In some embodiments, commuter module 130 is installed as a mobile device application on the mobile device carried by the corresponding commuter. In some embodiments, the system provides alerts and advisories to those commuters who are identified as users of the system by having installed the specific applications on their mobile devices, or having registered with the central module.

Communication network 140 enables communication between various devices and modules, such as central module 110, driver module 120, and commuter module 130. In various embodiments, communication network 140 includes a wireless network system or a wired network system. In some embodiments, central module 110 is connected to network 140 through a wireless connection, a wired connection, or a combination of both. In some embodiments, driver module 120 and commuter module 130 are connected to network 140 through wireless connections.

FIG. 1B is a block diagram of central module 110 according to some embodiments. Central module 110 includes an input/output module 112, an internal communication channel 113, a locator module 114, an alternative travel advisory module 116, a dashboard module 118, and a storage module 119. In general, modules of system 100 may be implemented in various ways, such as, for example, in software, hardware, firmware, or combinations thereof, dependent on requirements of various applications.

I/O module 112 is configured to receive information from external systems through the external communication network and transmit that information to the other modules in central module 110. I/O module 112 is also configured to receive information from the other modules in central module 110 and transmit that information to external systems through the external communication network. In various embodiments, I/O module 112 includes a wireless I/O module, a wired I/O module, or both.

Internal communication channel 113 is configured to enable communication among the modules in central module 110. In various embodiments, channel 113 includes one or more of solid state connections, wired connections, wireless connections, bus communication connections, and other types of internal connections.

Locator module 114 is configured to locate one or more commuters. In various embodiments, locator module 114 locates a commuter by methods such as triangulation or GPS locating, or by receiving location identifying messages from the commuter's module. In some embodiments, locator module 114 locates a commuter by receiving a message identifying the vehicle the commuter is boarding and further by locating the vehicle. In some embodiments, instead of tracking the location of each commuter separately, locator module 114 tracks a group of commuters boarding the same vehicle by tracking the vehicle. Locator module 114 may identify the vehicle to which a commuter has boarded by receiving, when the commuter boards the vehicle, a message from the commuter's module, a message from the driver module of the vehicle, or a location identifier matching the location of the commuter with the location of the vehicle at a station.

Locator module 114 may assign the location of the vehicle to the commuter that is boarding the vehicle as long as the commuter is aboard the vehicle. Moreover, locator module 114 may de-couple the commuter from the vehicle when the commuter gets off the vehicle. In various embodiments, locator module 114 determines that a commuter has left a vehicle by receiving a message from the commuter's module, a message from the driver module of the vehicle, or a location identifier that determines that the location of the commuter no longer matches the location of the vehicle. A location identifier may periodically compare the location of a commuter and a vehicle to which the commuter boarded earlier to determine whether the commuter is still aboard that vehicle.

In some embodiments, the locator module locates a commuter at a public transport stop. The locator module may assign the location of a stop to a commuter if the location of the commuter matches the location of the stop. Alternatively, in some embodiments, the commuter may use the commuter module to enter the commuter's location as the stop. The locator module may further determine the number of commuters awaiting at the public transport stop and transmit that number to one or more driver modules or commuter modules. In some embodiments, the locator module further determines, from among the commuters at the stop, the number of commuters awaiting for a public transport vehicle along a specific public transport route. The central module may determine this number by using, for each commuter, the commuter's public transport route, as selected by the commuter and transmitted to the central module.

Advisory module 116 is configured to generate alternative travel advisories for the commuters. Dashboard module 118 is configured to present information as a "dashboard" display that includes the status of the public transport vehicles or their routes. In some embodiments, dashboard module 118 includes a display for displaying the information to users interacting with control module 110. Storage module 119 is configured to store information that includes, for example, public transport schedules or maps, or status of public transport vehicles or commuters. The structure and functionalities of these modules are described below in more detail.

Figure 2A:
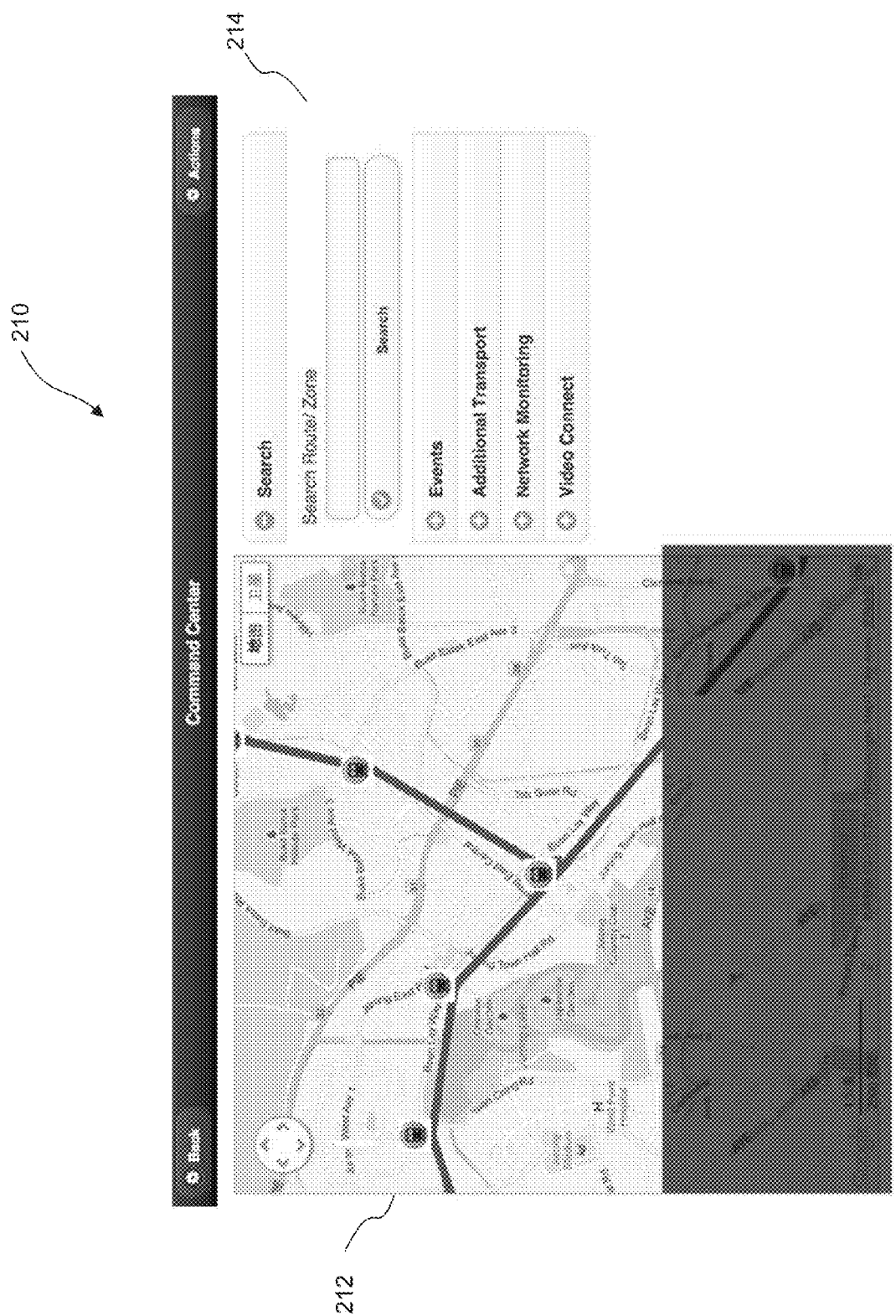
FIGS. 2A-2E depict displays shown to different users of the system according to some embodiments.

FIG. 2A shows a central display 210 according to some embodiments. Central display 210 may be one of the displays shown by the central dashboard module in the central control station. Display 210 may include information about the status of the public transport system, its routes, and its vehicles, at different locations. In FIG. 2A, display 210 includes a map section 212 and a search section 214. Map section 212 shows a map of some public transport routes superimposed on a street map of the section of a city covered by the public transport routes. In particular, in FIG. 2A, map section 212 shows a train route superimposed on a street map. Search section 214 includes various menu items that enable a control station user to search for various items such as events. An event may include an incident that affects the schedule of a public transport vehicle. For example, an event may include a traffic jam, a vehicle breakdown, a roadblock, or an overcrowded vehicle.

Figure 1C:
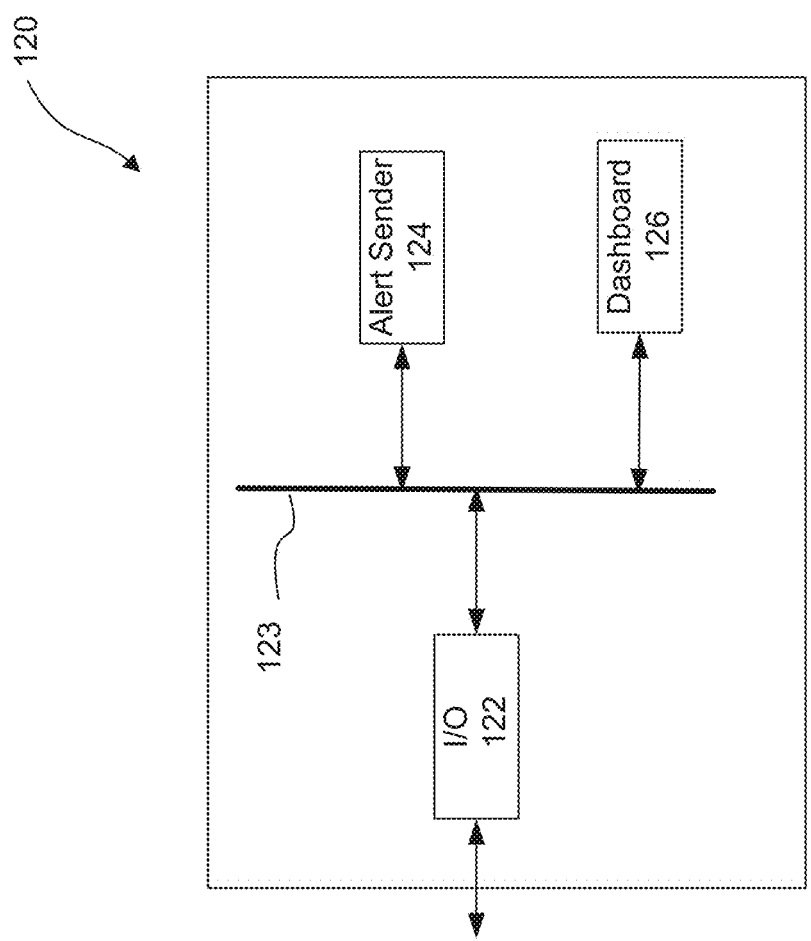

FIG. 1C shows a block diagram of driver module 120 according to some embodiments. Driver module 120 includes an input/output module 122, an internal communication channel 123, an alert sender module 124, and a dashboard module 126.

I/O module 122 is configured to receive information from external systems through the external communication network and transmit that information to the other modules in driver module 120. I/O module 122 is also configured to receive information from the other modules in driver module 120 and transmit that information to external systems through the external communication network. In some embodiments, I/O module 122 includes a wireless I/O module.

Internal communication channel 123 is configured to enable communication among the modules in driver module 120. In various embodiments, channel 123 includes one or more of solid state connections, wired connections, wireless connections, bus communication connections, and other types of internal connections.

Alert sender module 124 is configured to send alerts to external devices or modules. The structure and functionalities of the alert sender are described below in more detail. Dashboard module 126 is configured to present information that includes the status of the public transport vehicle on which the driver module is installed or the status of its route. In some embodiments, dashboard module 126 includes a display for displaying the information to the driver or for receiving inputs from the driver.

Figure 2B:
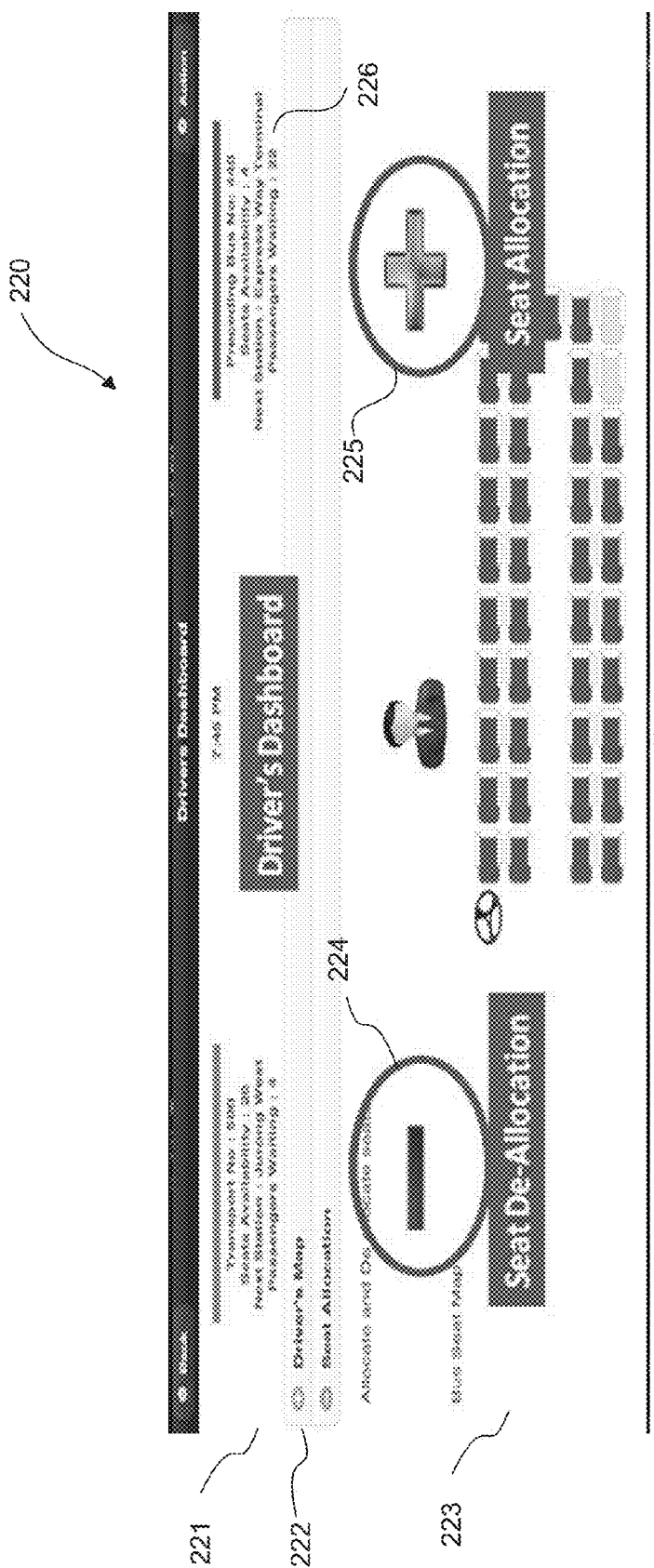

FIG. 2B shows a driver display 220 according to some embodiments. Driver display 220 may be one of the displays shown by the driver dashboard to the driver of a public transport vehicle. Display 220 includes a vehicle information section 221, a driver's map section 222, a seat allocation section 223, and a preceding bus section 226.

Vehicle information section 221 displays information about the vehicle, its available seats, the next station, and the number of commuters waiting in that station. In some embodiments, the system determines the number of commuters waiting in a station based on information received from the locator modules of the commuters, or the transportation routes by the commuters, or both.

Display 220 enables the driver to either expand or contract driver's map section 222 and seat allocation section 223. In FIG. 2B, driver's map section 222 is contracted and seat allocation section 223 is expanded. As shown in FIG. 2B, seat allocation section 223 includes a seat de-allocation button 224 and a seat allocation button 225. Seat de-allocation button 224 enables the driver to de-allocate a seat of the vehicle when the seat becomes unavailable if, for example, a commuter takes the seat. Actuating seat de-allocation button 224, therefore, decreases the total number of available seats of the vehicle, as shown in section 221. Seat allocation button 225, on the other hand, enables the driver to allocate a seat of the vehicle when the seat becomes available if, for example, a commuter vacates a seat. Actuating seat allocation button 225, therefore, increases the total number of available seats of the vehicle, as shown in section 221. In some other embodiments, the number of available seats is detected by sensors installed in the vehicle. The sensors can include, for example, counters that count the number of passengers entering and leaving the vehicle, and accordingly determine the total number of passengers that are onboard. Alternatively, the sensors may include visual sensors or weight sensors that detect the number of seated passengers or the vacant seat. The sensors may also include processors that determine the number of available seats by subtracting the number of passengers onboard from the number of seats.

Preceding bus section 226 includes information about an upcoming station and a preceding vehicle. A preceding vehicle is a vehicle that is serving the commuters on the same route as the present vehicle and is ahead of the present vehicle. The preceding vehicle will thus reach the upcoming station before the present vehicle. Section 226 includes information about the number of commuters that are waiting for the preceding vehicle at the upcoming station and also information about the preceding vehicle's available seats. In some embodiments, and based on the information in section 226, a driver may thus determine whether the driver needs to stop at the upcoming station. In some embodiments, if no commuter requests a stop in the upcoming station and if the preceding vehicle can service all waiting commuters in that station, the driver may plan not to stop in the upcoming station. Alternatively, if the driver notes that the sum of the number of the available seats in the preceding vehicle and the present vehicle will not suffice for accommodating the commuters awaiting in the upcoming station, the driver may send an alert and request some backup vehicles.

In some embodiments, display 220 further includes input buttons that enable the driver to indicate that the vehicle is overcrowded or underused. An overcrowded vehicle may be a vehicle that does not have any available seats, cannot board any more commuters, or cannot accommodate all commuters awaiting the vehicle in the next stops. An underused vehicle, on the other hand, may be a vehicle that has a large number of seats available or for which the number of available seats exceeds the number of commuters awaiting the vehicle in the next stops. In some embodiments, the central module determines whether a vehicle is overcrowded or underused based on the number of seats available in the vehicle, the number of commuters waiting for the vehicle, or both. In various embodiments, the driver module informs the central module or one or more commuter modules about the status of seating the in the vehicle.

Figure 1D:
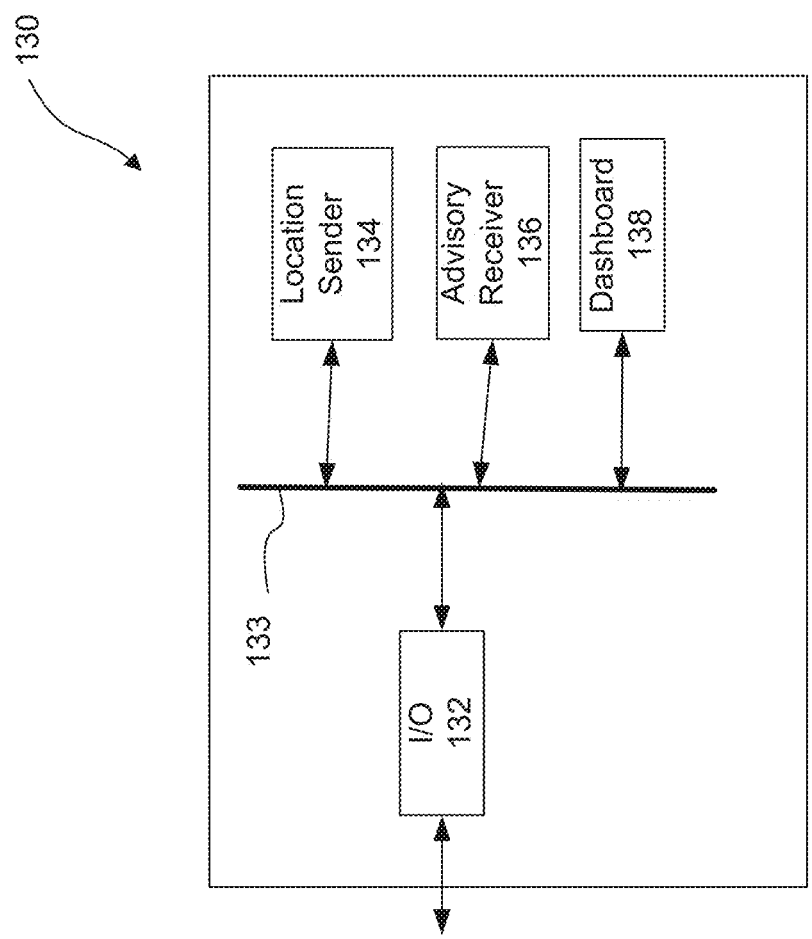

FIG. 1D shows a block diagram of commuter module 130 according to some embodiments. Commuter module 130 includes an input/output module 132, an internal communication channel 133, a location sender module 134, an advisory receiver module 136, and a dashboard module 138.

I/O module 132 is configured to receive information from external systems through the external communication network and transmit that information to the other modules in commuter module 130. I/O module 132 is also configured to receive information from the other modules in commuter module 130 and transmit that information to external systems through the external communication network. In some embodiments, I/O module 132 includes a wireless I/O module.

Internal communication channel 133 is configured to enable communication among the modules in commuter module 130. In various embodiments, channel 133 includes one or more of solid state connections, wired connections, wireless connections, bus communication connections, and other types of internal connections.

Location sender module 134 is configured to send information related to the location of the commuter to external devices or modules. In some embodiments, location sender module 134 is a wireless communication module that communicates with wireless communication centers and enables the central module to locate the commuter by methods such as triangulation or GPS locating. In some embodiments, the location sender module is a wireless trigger sender, which enables the user to send a wireless signal to the central module to indicate the location of the commuter or the specific vehicle that the commuter is boarding. Advisory receiver module 136 is configured to receive the alternative travel advisory from the central module. The structure and functionalities of these modules are described below in more detail.

Figure 2C:
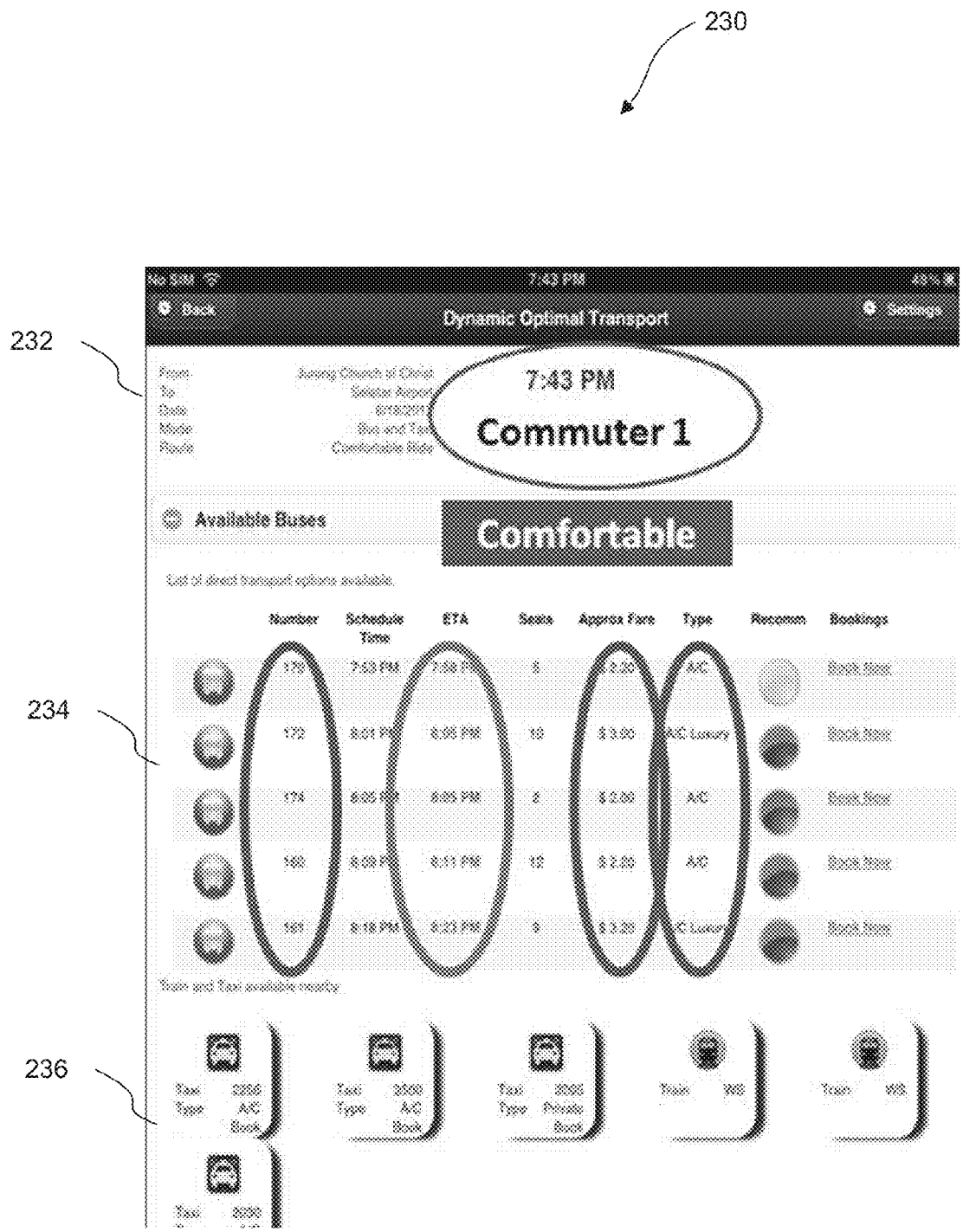
Figure 2D:
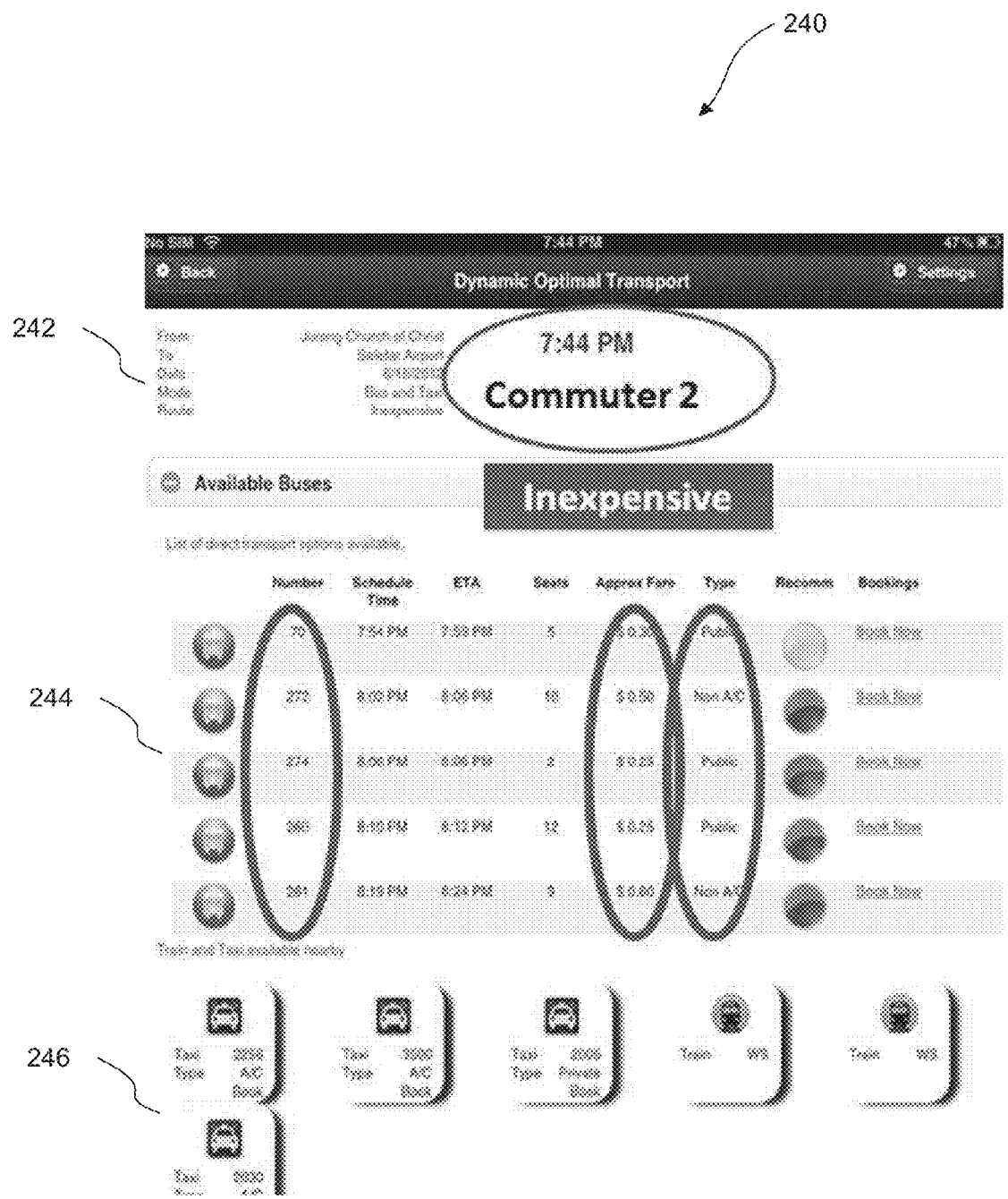
Figure 2E:
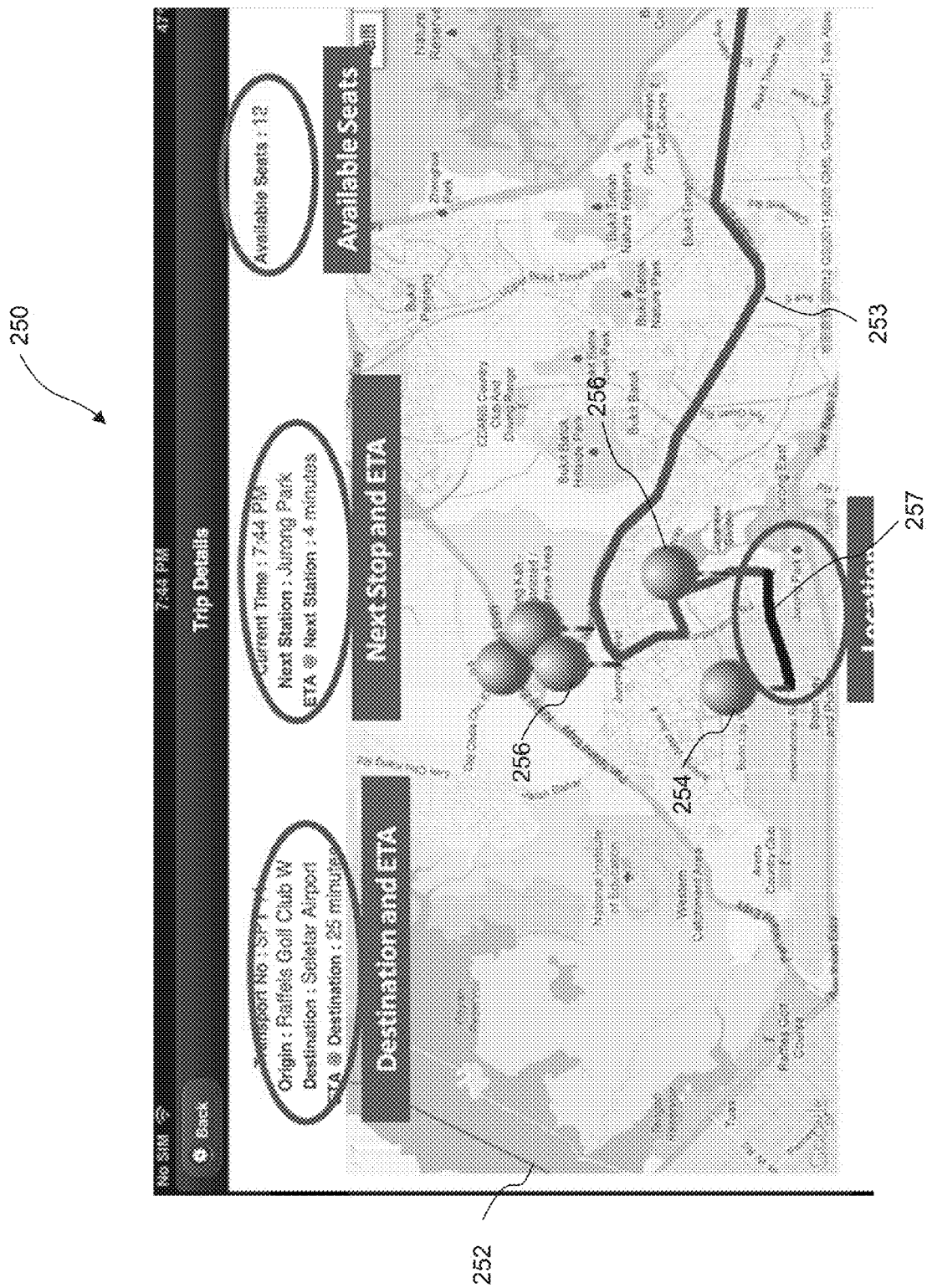

Dashboard module 138 is configured to present information that includes status of the commute of the commuter or the alternative travel advisory. In some embodiments, dashboard module 138 includes a display for displaying the information to the commuter. In some embodiments, dashboard module 138 is further configured to receive inputs from the commuter and transmit that input to the public transport system through input/output module In various embodiments, the commuter module facilitates the use of public transport for the commuters. In some embodiments, the commuter modules, through their dashboards and displays, enable commuters to control their journey or reduce their waiting time at interchanging terminals. FIGS. 2C, 2D, and 2E show three different commuter displays 230, 240, and 250 according to various embodiments. The commuter displays may be shown by the commuter dashboard to one or more commuters in public transport vehicles.

In FIGS. 2C and 2D, commuter displays 230 and 240 show two different sets of travel options for a first and a second commuter, respectively, for travelling from an origin to a destination. Displays 230 and 240 may be shown to on a respective commuter module when the respective commuter inquires about options for travelling from the origin to the destination by public transport.

In FIG. 2C, commuter display 230 includes a travel summary section 232, a bus options section 234, and an alternative options section 236. Travel summary section 232 includes, for the first commuter, information about the origin, the destination, the date, the modes of transport, and the route preferences. The origin indicates the starting point of the routes shown to the first commuter. The origin may be entered by the commuter or detected by the public transport control system based on the location of the commuter. The destination indicates the ending point of the routes shown to the first commuter. In some embodiments, the destination may be entered by the commuter. In various embodiments, the origin or the destination may be points of interest or public transport stations.

The mode section (labeled "Mode" in section 232, FIG. 2C) shows one or more modes of public transport included in the options shown in display 230. In various embodiments, the modes of transport may be entered by the commuter when requesting travel options, may be selected from the preferences of the commuter as stored in the commuter module or the central module, or may include the modes of transport available for travelling between the origin and the destination. In the example of display 230, the available modes are "bus" and "taxi."

The route preference (labeled "route" in section 232, FIG. 2C) indicates the preferences of the first commuter for travel between specific locations. In various embodiments, the preferences may include level of comfort, price limit, speed, duration, distance travelled, or modes of transport. In various embodiments, the preference may be entered by the commuter when requesting the travel options or may be stored as the preferences of the commuter in the commuter module or the central module. Display 230 shows that the first commuter, for example, prefers a comfortable ride. A comfortable ride may be defined as a ride in a vehicle that includes an air conditioning system (A/C) or in which a seat is available for the commuter. The system may use the preference as a criterion when selecting travel options for the commuter. In particular, from among all available options for travelling between the specified origin and destination, the system first selects those that match the preferences of the commuter. In various embodiments, travel summary section 232 may also include an expected time of arrival (ETA) which indicates the approximate time or the latest time that the commuter wishes to arrive at the destination.

Bus options section 234 shows five different bus routes that are suggested to the first commuter. For each route, section 234 may show the bus number, the time of arrival according to the bus schedule, the expected time of arrival at the destination (ETA), the number of available seats, the approximate bus fare, the type of bus, a recommendation column that shows a color coded circle indicating whether the system recommends the option, and a link to book a seat at the bus. The first option in a first row, for example, shows that bus number 170 is scheduled to arrive at the destination at 7:53 PM, is expected to arrive there at 7:58 PM, has five available seats, has an approximate fare of $2.20, is an A/C type bus, and has a level of recommendation of "yellow," which is a mid-level recommendation. A second option, in a second row, on the other hand, shows that, among other things, for bus number 172, the level of recommendation is "green," which is the highest level of recommendation. And a third option, shown in a third row, indicates that, among other things, for bus number 174, the level of recommendation is "red," which is the lowest level of recommendation. The system may provide a level of recommendation based on similarity of the vehicle's type or ETA to the commuter's preferences.

Alternative section 236 shows alternative transport options that are available to the commuter. In the example of FIG. 2C, the alternative transport options include four taxi routes and two train routes.

In various embodiments, a commuter uses the above information in the commuter display to decide on a travel plan. In particular, a commuter may use one or more of the ETA, the number of available seats, the approximate fare, the type, and the recommendation column to decide whether to use one of the available bus routes.

In FIG. 2D, commuter display 240 includes a travel summary section 242, a bus options section 244, and an alternative options section 246. Various features of these sections are similar to their counterparts in display 230 of FIG. 2C. Display 240, however, shows that the second commuter has selected as a preference the inexpensive options. The system uses this preference as a criterion when selecting travel options for the second commuter. In particular, from among all available options for travelling between the origin and the destination, the system first selects for the second commuter those options that are less expensive and also fit other preferences.

Bus option section 244 shows five different bus routes that are suggested to the second commuter. These bus routes differ from the five bus routes presented to the first commuter in FIG. 2C. In particular, a comparison of the approximate fare and type information in FIGS. 2C and 2D indicates that the system proposes to the first commuter options that are more comfortable (i.e., all are A/C or A/C luxury types) and proposes to the second commuter options that are less expensive (as reflected in the fares). These differences comply with the preferences chosen by the first and second commuters.

In some embodiments, when a commuter has boarded a vehicle, the dashboard of the respective commuter module displays to the commuter a route monitor showing the movement of the vehicle. FIG. 2E shows a route monitor display 250 according to some embodiments. Display 250 includes a map section 252, showing a local map that marks a route 253 of the vehicle. Route 253 includes features such as markings for bus stations (e.g., stations 254-256), and a location marker 257 marking the present location of the vehicle (marked by, e.g., a sign such as an oval in FIG. 2E, a different color, highlighting, or other indicator). In FIG. 2E, for example, location marker 257 shows that the vehicle is between stations 254 and 255. As the vehicle advances along route 253, the system accordingly updates location marker 257 to show the up to date location of the vehicle.

In some embodiments, the dashboard of the respective commuter module also displays to a commuter various types of messages. The messages may include updates or advertisements. The information included in the message may be time-based, location-based, or context-based. A time-based message may be based on the time of the day or the time of the year. For example, a time-based message during a lunch time may be an informative message about or an advertisement for a restaurant with specific lunch offers. A time based informative message during the dinner time, on the other hand, may be about or an advertisement for a restaurant with specific dinner offers. A time based advertisement may also be information or advertisements for season specific apparel shown in the corresponding season.

A location-based message may be based on the location of the commuter. A location-based message may include, for example, informative messages about or advertisements for the merchants or businesses that are located near the present location of the commuter.

A context-based message may be related to the context of the commuter's activities or the purpose of the commute. When a commuter arrives in a city through an airport, for example, the system may deduce that the commuter is on vacation. The system may send to a vacationing commuter messages related to the context of vacation, which may include informative messages about or advertisements for sightseeing or city tours. Alternative, when a commuter's ETA shows that the commuter has additional time to spend before leaving for the commuter's destination, the system may send to the commuter information in the context of relaxation, e.g., entertainments that can fill that additional time.

In various embodiments, the commuter module enables the commuter to receive coordinated event-driven advisories to act in response to changes, such as disruptions. Various embodiments implement situation-aware real-time updates of commuting plans. Situation awareness demands real-time access to information regarding events and state of the commuter and vehicles.

Figure 3:
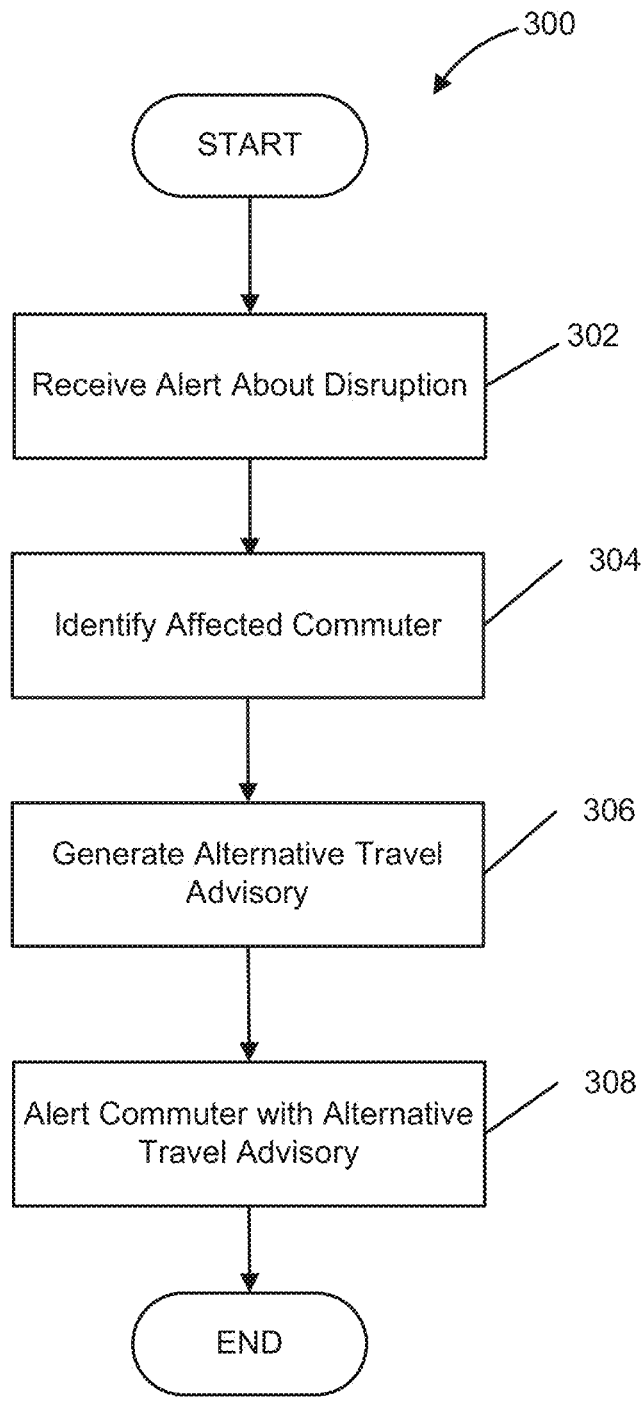
FIG. 3 is a flow chart of a method for detecting a disruption and sending the alert to the commuter according to some embodiments.

Various embodiments provide a situation aware public transport control system. The situation aware system may receive information about various transport related events and maintain an up to date status of various locations in the public transport system. The situation aware system may also track one or more commuters and provide updated travel advisories to the commuters based on events that affect their commutes. In some embodiments, the public transport control system may detect a disruption in the commuting schedule of a commuter and send to the commuter an alert, along with an alternative travel advisory. FIG. 3 shows a method 300 for detecting a disruption and sending an alert to the commuter according to some embodiments. In various embodiments, method 300 is performed by one or more modules of the system, such as the central module. FIGS. 4A-4E, on the other hand, show various dashboard displays related to the disruption and shown to different stakeholders of the system.

In block 302 of FIG. 3, the system receives an alert about a disruption affecting the transport schedule of one or more public transport vehicles. In various embodiments, the disruption may arise from a roadblock, a traffic jam, a breakdown of a vehicle, or other incidents. In some embodiments, various events and relevant information are collected by the system itself. The system may receive the alert, for example, from the driver of the vehicle, from the driver of another vehicle that notices the disruption, or from a sensor that monitors the state of the traffic at one or more places along the route.

Figure 4A:
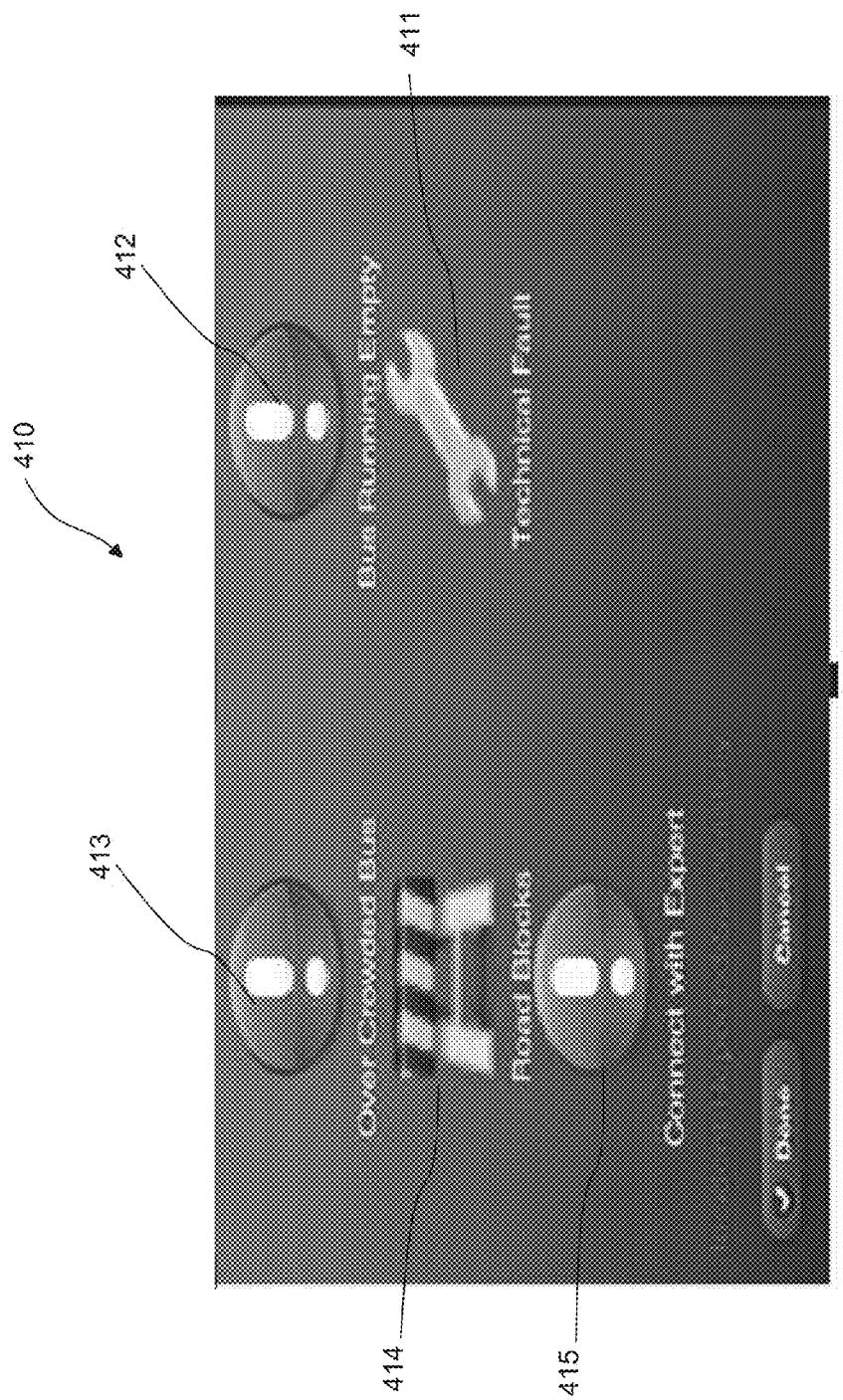
FIGS. 4A-4E depict dashboard displays related to a disruption and as shown to various stakeholders of the system, according to some embodiments.

Some embodiments enable public transport operators to provide input into the system and to be the direct sources of information about continuously changing commuting conditions. FIG. 4A shows an exemplary alert display 410 for a driver of a public transport vehicle according to some embodiments. A driver of a public transport vehicle may use the alert display to create an alert that is sent, by the alert sender, to the central module of the system. Alert display 410 may be one of the displays shown by the driver dashboard to the driver of a public transport vehicle.

In FIG. 4A, alert display 410 includes buttons 411-415 for reporting different disruptions or requests. In some embodiments, a touch screen shows display 410, and buttons 411-415 are virtual buttons enabled on the touch screen. Actuating each button may send a corresponding message to the central module. In particular, actuating technical fault button 411 sends an alert indicating that the vehicle is encountering a technical fault, actuating no-fuel button 412 sends an alert indicating that the vehicle is out of fuel, actuating overcrowded button 413 sends an alert indicating that the vehicle is over-crowded and cannot board more commuters, actuating roadblock button 414 sends an alert indicating that the vehicle has encountered a roadblock, and actuating expert-connection button 415 sends an alert indicating that the driver desires to connect to an expert for diagnosing or solving a problem.

Returning to FIG. 3, in block 304, the central module identifies one or more commuters that are affected by the disruption indicated by the alert. In various embodiments, the central module does so by tracking one or more public transport vehicles and also tracking commuters that use the system and are boarding those vehicles.

Figure 4B:
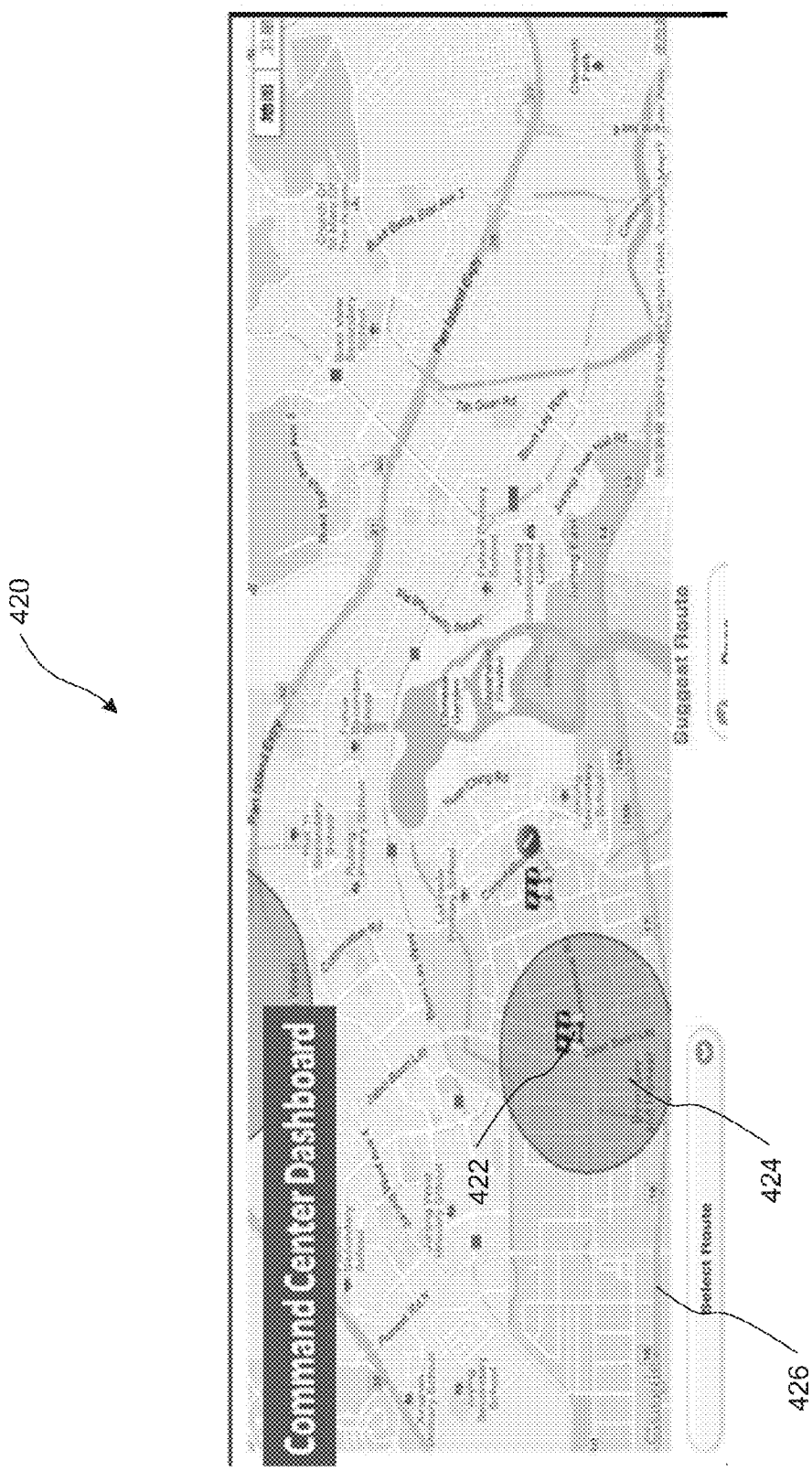

FIG. 4B shows a transport monitoring display 420 shown by the dashboard of the central module after receiving an alert, according to some embodiments. Display 420 shows that the central module has received an alert indicating a roadblock in location 422. Moreover, based on the location of the roadblock or traffic report information, the central module has identified a zone 424 in which the traffic may be affected by the roadblock. Based on the affected zone, the central module may further identify that the disruption will affect the normal schedule of those public transport vehicles, such as busses, which travel along route 426.

Figure 4C:
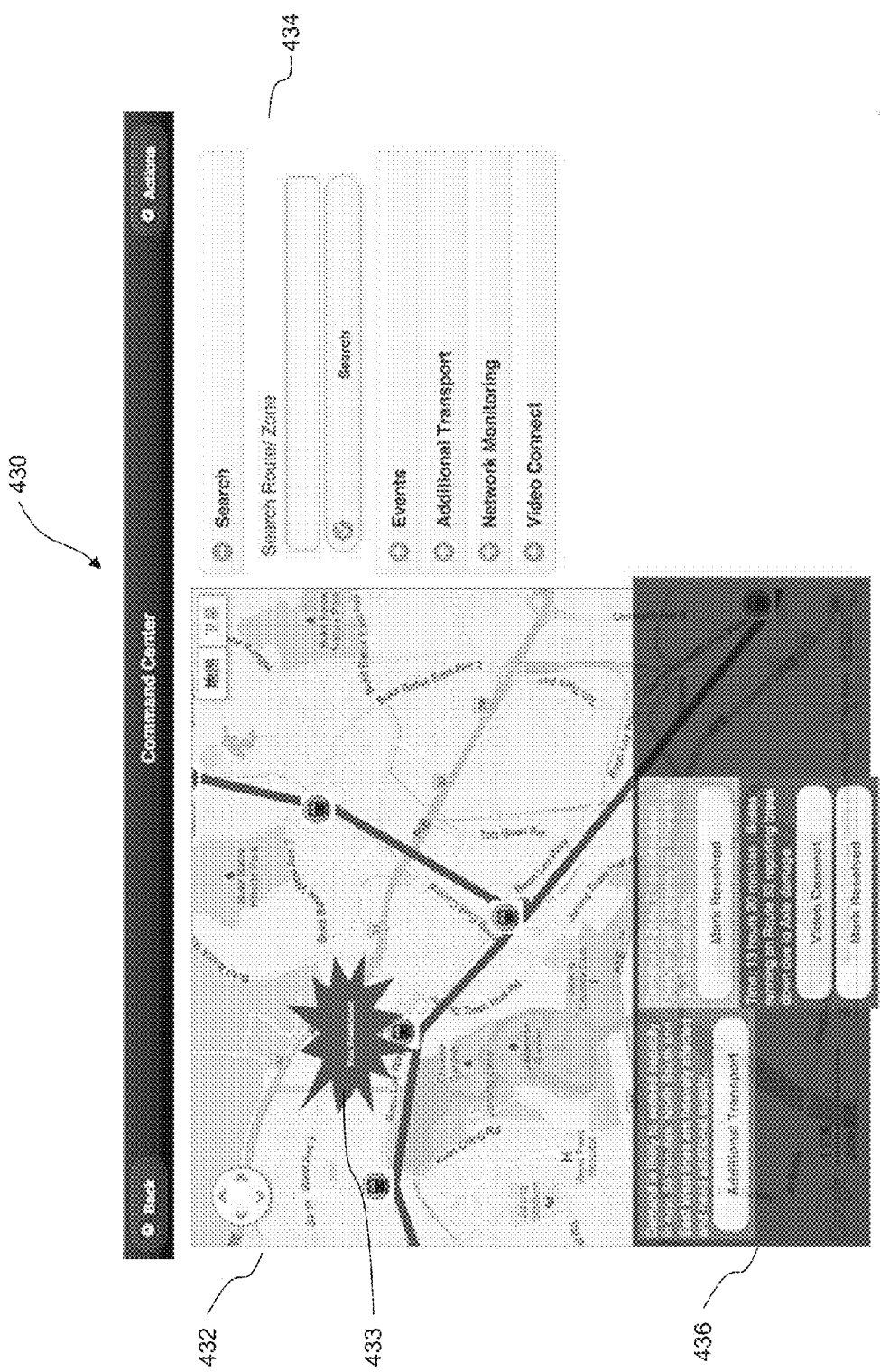

FIG. 4C shows another transport monitoring display 430 shown by the dashboard of the central module after receiving an alert, according to some embodiments. Display 430 may be shown in an alert situation and may replace a normal situation display, such as display 210 of FIG. 2A. Display 430 includes a map section 432, a search section 434, and an action section 436. Map section 432 indicates that a bus has broken down at location 433. Search section 434 provides different options, which include a network monitoring to monitor the status of the disruption at location 433 and a video connect option to connect to the driver of the broken down bus.

Action section 436 provides various options for taking actions. The options include a first button for requesting additional transport vehicles to assist stranded commuters. Such an action may be taken when, for example, a backup vehicle is required to take the place of a broken down vehicle, or to board commuters along a route for which the vehicles are overcrowded and cannot accommodate all waiting commuters. Additional transport vehicles may also be deployed to alternative routes that commuters are advised to take in place a route that is blocked. In some embodiment in which the central module receives an alert about an underused vehicle, action section 436 may enable de-allocating a second vehicle from the route of the underused vehicle. In FIG. 4C, action section 436 also includes a second button for marking the problem resolved.

In some embodiments, upon identifying the affected public transport routes, the central module further identifies one or more vehicles in those routes that are moving towards the affected zone and will thus be delayed due to the disruption. In some embodiments, in which the alert is sent by the driver of a vehicle, the central module identifies that vehicle as an affected vehicle. The central module may also estimate an amount of a delay for each affected vehicle based on the speed of the traffic flow, the location of the vehicle, or the amount of the overlap between the route of the vehicle and the affected zone.

In some embodiments, upon identifying one or more vehicles that are delayed due to the disruption, the central module further identifies one or more commuters that are boarding those vehicles and who will be affected by the delay. In some embodiments, the central module identifies the affected commuters from among those commuters who are users of the system. The central module may find the vehicle that a commuter is boarding by tracking the location of the commuter and matching that location with the location the vehicle. In some embodiments, the user identifies the vehicle the commuter has boarded by sending an identifying message after boarding the vehicle.

In some embodiments, upon identifying a commuter that is boarding an affected vehicle, the central module determines whether that commuter will be affected by the delay. In some embodiments, the central module makes such determination if the delay may cause the commuter not to meet the commuter's ETA.

Returning to FIG. 3, in block 306 the central module generates one or more alternative travel advisories for an affected commuter in the manner detailed below. In various embodiments, the alternative travel advisory is individualized for each commuter. An individualized advisory may be based on the location, destination, ETA, and other preferences of the commuter, and is generated and sent to the commuter. An alternative travel advisory may include a message informing the commuter about the disruption or the risk that the commuter may not meet the ETA. In some embodiments, the alternative travel advisory may also include an alternative travel option that is different from, and causes less delay compared to, the commuter's present travel plan. In some embodiments, the central module generates an alternative travel advisory based on one or more factors including the destination of the commuter, the ETA of the commuter, the location of the commuter and its distance to one or more stations, the schedules of one or more public transport vehicles reaching nearby stations, and the preferences of the commuter. Some exemplary embodiments of methods of generating alternative travel advisories are explained in relation to FIGS. 5 and 6.

In block 308, the central module sends an alert to an affected commuter, informing the commuter of the delay and recommending to the commuter one or more alternative travel plans. In some embodiments, the central module sends an alternative travel advisory to a commuter who is boarding an affected vehicle and is reaching a station, and advises the commuter to get off the present vehicle at that station and board a different vehicle. In some embodiments, the central module sends an alternative travel advisory to a commuter who is boarding a vehicle that is stranded between two stations and advises the commuter to leave the vehicle, go to a nearby station, and board a different vehicle. In some embodiments, the alternative travel advisory advises the commuter to leave the commuter's present public transport route of travel and instead take a different route to reach the destination. In some embodiments, the alternative travel advisory includes leaving the present vehicle and walking to a station along the same or a different route, past the affected zone.

Figure 4D:
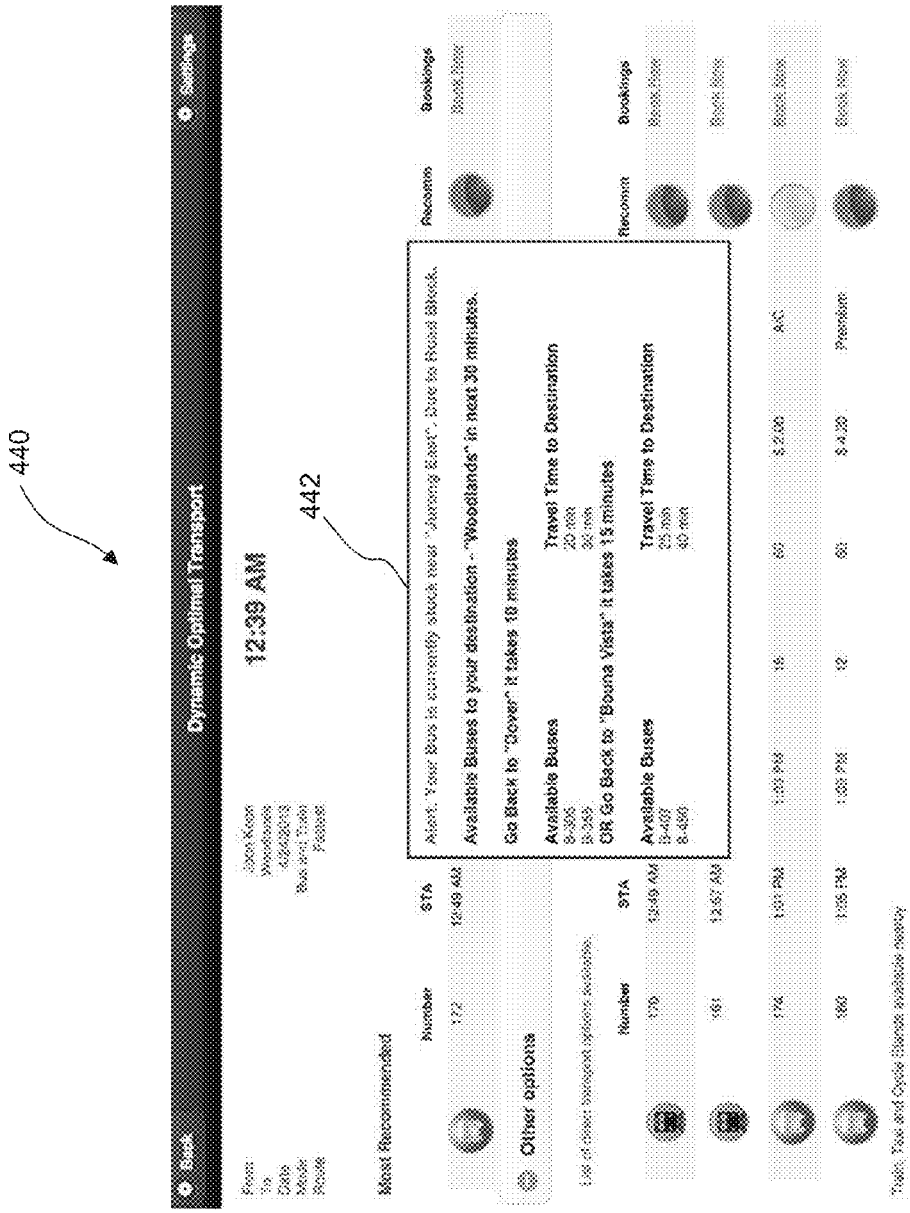

FIG. 4D shows a commuter alert display 440 displayed by the dashboard of the commuter module after receiving an alert, according to some embodiments. Display 440 includes an alert message 442 superimposed over the commuter's normal display. Alert message 442 informs the commuter of a disruption that will affect the commuter's transport plans. Further, alert message 442 informs the commuter of one or more alternative travel options. In alert message 442, for example, the alternative travel options include going back to one of two different stations (named "Dover" and "Bouna Vista") and taking one of two different busses that reach each of those stations and can take the commuter to the commuter's destination (i.e., busses B-305 and B-355 at Dover station and busses B-407 and B-450 at Bouna Vista station). Alert message 442 also provides the time duration for reaching each station and the travel time for reaching the destination under each option.

Figure 4E:
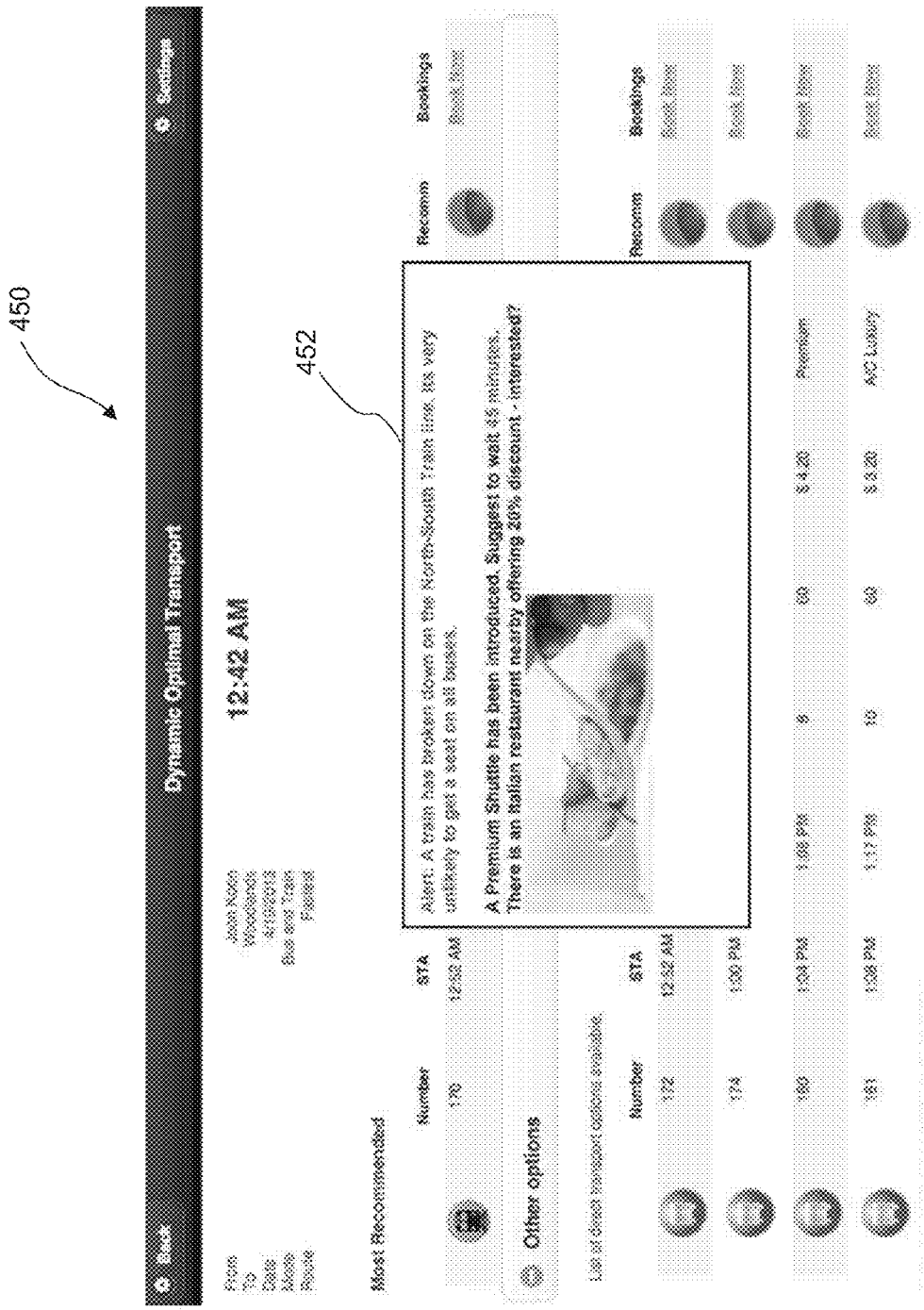

In some embodiments, the alert message shown to a commuter includes one or more advertisements that correspond to the alert. FIG. 4E shows a commuter alert display 450 shown by the dashboard of the commuter module after receiving an alert, according to some embodiments. Display 450 includes an alert message 452 superimposed over the commuter's normal display. Alert message 452 informs the commuter of a disruption that will affect the commuter's transport plans. Further, alert message 452 informs the commuter of an alternative plan, in this case a replacement shuttle and the expected waiting time. Alert message 452 also includes an advertisement for a restaurant that the commuter can use while waiting for the shuttle and also offers to the commuter a discount for the restaurant.

In various embodiments, the alert message is customized based on the context, the commuter's personal preferences, or both. In particular, an advertisement shown along with the alert may be customized to fit the delay time resulting from a disruption. The advertisement may thus relate to an activity that fits the commuter's schedule and the expected delay. Moreover, the advertisement may be based on the personal preferences of the commuter. In some embodiments, a commuter may enter into the system non-commute related preferences, such as the commuter's preferences in food, clothing, type of shopping, price range, or stores. The system may then personalize the advertisements that are sent along with an alert based on the commuter's preferences. In FIG. 4E, for example, the commuter may have previously entered into the system the commuter's preference for Italian food. The system thus may include in the alert shown in FIG. 4E an advertisement for an Italian restaurant that is near the location of the commuter and its wait time fits the commuter's delay. In various embodiments, the information about the commuters' preferences, available commercial venues, and other information needed for the advertisement are stored in and retrieved from one or more storage systems, such as storage module 119 of central module 110.

Various embodiments present efficient mechanisms for generating alternative travel plans in response to disruptions in the travel plans of one or more commuters. In particular, some embodiments detect the disruption and find alternative travel plans for one or more affected commuters based on public transport networks and timetables. The mechanisms of the embodiments can serve a large number of commuters in an efficient manner and free from long delays.

Figure 5:
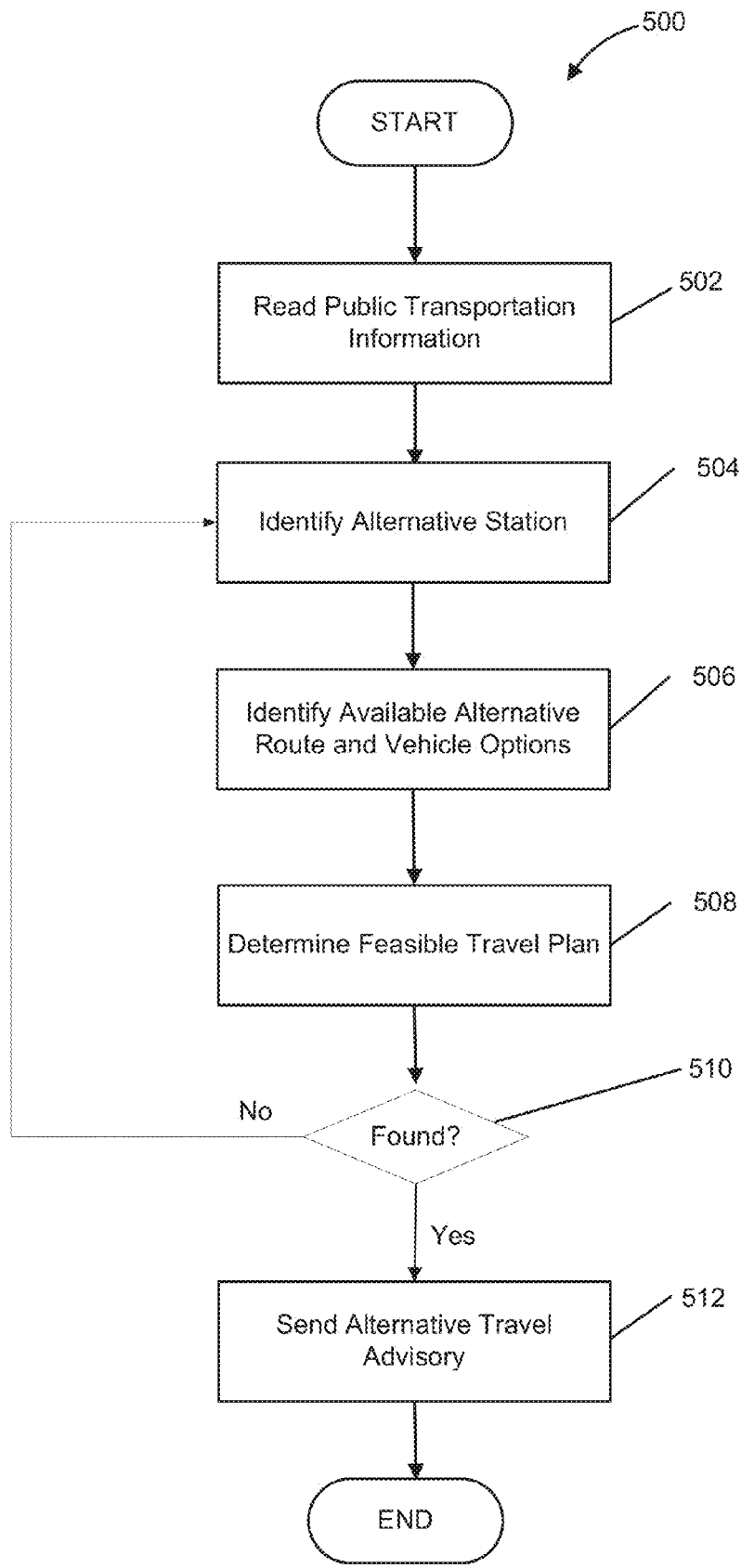
FIG. 5 is a flow chart of a method for generating one or more alternative advisory travel plans according to some embodiments.
Figure 6A:
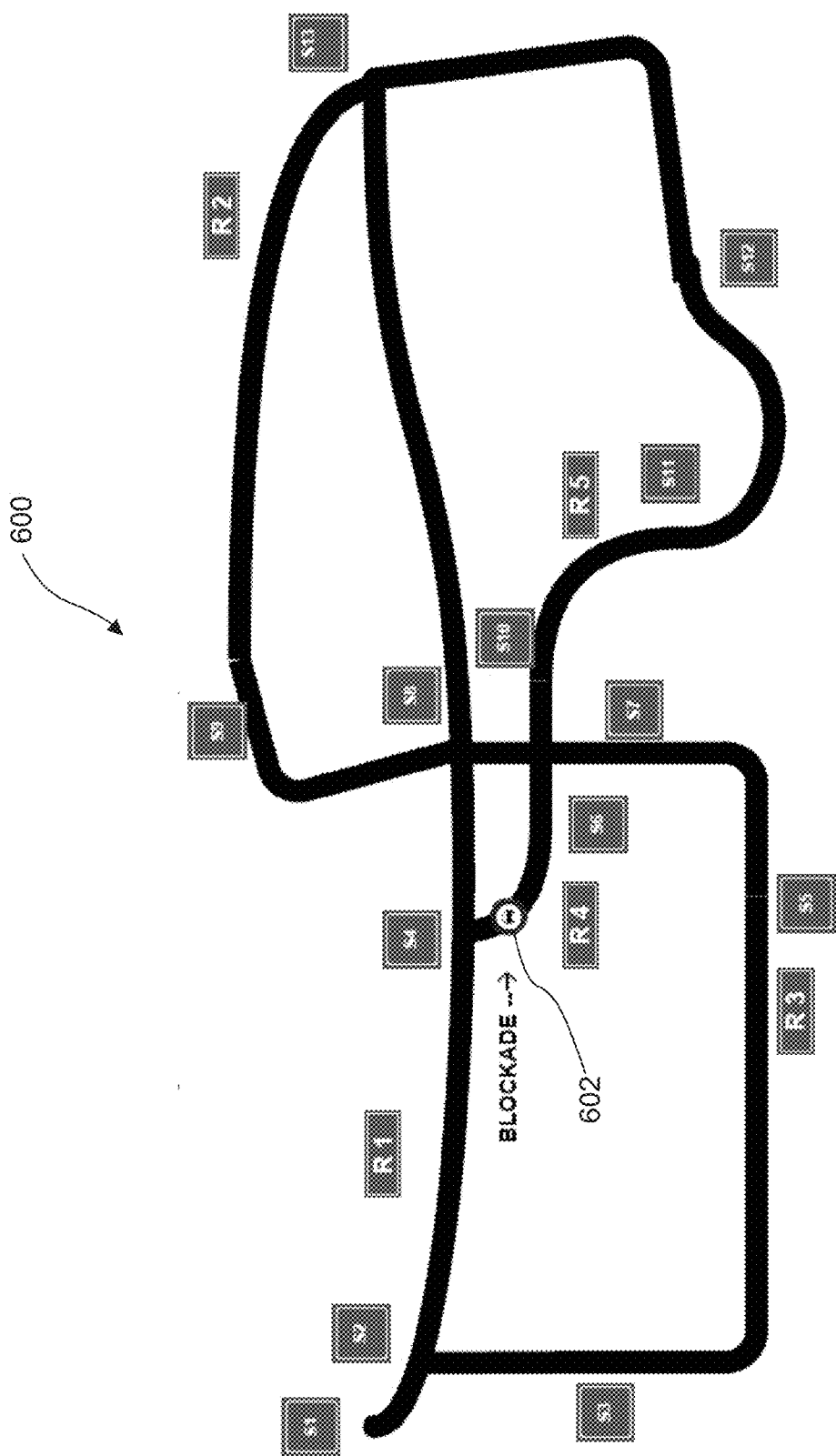
FIGS. 6A and 6B illustrate an exemplary scenario in a bus commute system to which the method of FIG. 5 is applied.
Figure 6B:
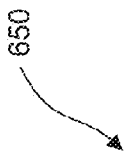

FIG. 5 shows a method 500 for generating one or more alternative advisory travel plans according to some embodiments. Further, FIGS. 6A and 6B illustrate an exemplary scenario in a bus commute system to which method 500 is applied. In various embodiments, the central module quickly generates the advisories for each commuter that is using the system right after the system detects a disruption. Further, the central module can dynamically update the advisories for each commuter along the commuter's route in accordance to the changes in the state of the traffic in different locations.

In FIG. 5, at block 502, the system reads in a public transport information. In some embodiments, this information includes public transport maps or public transport schedules. In various embodiments, a map includes information about different routes covered by the public transport system and a schedule includes information about the timetable of the vehicles working along the routes. FIG. 6A shows an exemplary map of a bus network 600 and FIG. 6B shows an exemplary bus schedule timetable 650 for the network shown in FIG. 6A.

FIG. 6A shows that bus network 600 includes thirteen bus stations, marked as S1 to S13, connected by busses travelling along five different bus routes R1 to R5. More specifically, bus route R1 connects stations S1, S2, S4, S8, and S13; bus route R2 connects stations S1, S2, S4, S9, and S13; bus route R3 connects stations S1, S3, S5, S7, S8, and S13 (R3 busses do not stop at S2); bus route R4 connects stations S1, S2, S4, S6, S10, S11, S12, and S13; and bus route R5 connects stations S1, S2, S3, S5, S7, S10, S11, S12, and S13.

In FIG. 6B, timetable 650 shows three different bus schedules for each of the routes R1 to R4, and four different bus schedules for the route R5. Row 651, for example, indicates that the first bus along route R1 is scheduled to leave station S1 at 9:00 and to reach stations S2, S4, S8, and S13 at 9:30, 10:30, 10:45, and 11:15, respectively. Row 652, on the other hand, indicates that the second bus along route R1 is scheduled to leave station S1 at 10:00 and to reach stations S2, S4, S8, and S13 at 10:30, 11:30, 11:45, and 12:15, respectively. In a similar manner, row 653 indicates that the first bus along route R4 is scheduled to leave station S1 at 9:10, and to reach stations S2, S4, S6, S10, S11, S12, and S13 at 9:40, 10:10, 10:40, 11:10, 11:40, 12:10, and 12:40, respectively. Similarly, row 654 indicates that the third bus along route R5 is scheduled to leave station S1 at 10:25 and to reach stations S2, S3, S5, S7, S10, S11, S12, and S13 at 10:55, 11:10, 11:35, 12:00, 12:25, 12:55, 13:25, and 13:55, respectively. Row 655, on the other hand, indicates that the fourth bus along route R5 is scheduled to leave station S1 at 10:45 and to reach stations S2, S3, S5, S7, S10, S11, S12, and S13 at 11:15, 11:30, 11:55, 12:20, 12:45, 13:15, 13:45, and 14:15, respectively.

In various embodiments, the central module uses public transport maps and timetables, such as those shown in FIGS. 6A and 6B, to generate alternative travel advisories. In an exemplary scenario based on FIGS. 6A and 6B, the central module generates alternative travel advisories for two commuters who are boarding a bus on the R4 route and who face a disruption at location 602 marked in FIG. 6A. In this scenario, the first commuter, called P1, boards the first bus along route R4 at station S1 at 9:10. P1 intends to reach station S13 by an ETA of 12:42. Because, as seen in timetable 650, this bus is scheduled to reach S13 at 12:40, this bus fits the ETA of P1. The second commuter, called P2, boards the same first bus along route R4 at station S2 at 9:40. P2 intends to reach S12 by an ETA of 13:30. Because this bus is scheduled to reach S12 at 12:10, it also fits the ETA of P2.

The bus reaches station S4 on time, that is, at 10:10. Then, at 10:20, the bus reaches location 602, where it faces a blockage that stops it from advancing along route R4. At this time, the central module receives an alert indicating the disruption in the progress of the bus. In various embodiments the alert may be sent by the driver of the bus, the driver of another bus that observes the blockade, or by monitoring devices installed at or near location 602.

Upon receiving the alert, the central module identifies commuters P1 and P2 as two users of the system who are in the bus and whose ETA will be affected by the disruption. The central module then applies various steps of method 500 in FIG. 5 to generate advisories for P1 and P2.

Returning to FIG. 5, in block 504, the central module identifies one or more stations that can be used as the start of an alternative travel plan for the commuter. In some embodiments, the central module identifies the station by finding the stations that are nearest to the commuter. In some embodiments, the found station may be the station in which the commuter is stranded, or a station that is along the route of the commuter. In some embodiments, the central module backtracks by finding the nearest station located along the route of the commuter and before the present location of the commuter. In some embodiments, the system forward tracks by finding the nearest station located along the route and after the location of the commuter. In some embodiments, the central module finds one or more stations that are at a close distance to the location of the commuter and are accessible on foot or by some other means of commute. In some embodiments, in selecting an alternative station, the central module also considers the distance of the station from the present location of the commuter and the time that it will take the commuter to reach that station. In some embodiments, the central module may discard a station as an alternative station if the station is at a distance or location that the commuter cannot reach within a specified period or by a means preferred by the commuter. A commuter may, for example, prefer not to walk and can thus reach the alternative station by taxi or another public transport means.

In the above scenario, for P1 and P2, in various embodiments the central module may backtrack from the location 602 of P1 and P2 to the nearest station S4 or forward track to the nearest station S6.

Returning to FIG. 5, in block 506, for each identified station, the central module identifies one or more routes that include that station. Moreover, for each identified route, the central module identifies as options one or more vehicles that travel the identified route and will reach that station at a later time. In the above scenario, after selecting station S4, for example, the central module may use bus network map 600 of FIG. 6A or timetable 650 of FIG. 6B to identify routes R1, R2, and R4 as available routes, because they include station S4. Moreover, the central module may use timetable 650 to identify bus options along those routes, which are, on route R1, the first to third busses reaching S4 at 10:30, 11:30, and 12:00, respectively; on route R2, second and third busses reaching S4 at 10:45 and 11:45, respectively; and on route R4, second and third busses reaching S4 at 10:25 and 10:40, respectively.

Returning to FIG. 5, in block 508, the central module selects from among the identified options those that offer feasible alternative travel plans for the commuter. In various embodiments a "feasible" alternative travel plan includes selecting a vehicle that can be boarded on time at the alternative station; that, when considered alone or in combination with other vehicles that cross its route, can deliver the commuter to the commuter's destination before or close to the commuter's ETA; or that fits the commuter's preferences. In various embodiments, a feasible alternative travel plan satisfies one or more of the above criteria. In various embodiments, to determine whether a vehicle can be boarded on time, the central module may consider, among other things, the time at which the commuter can reach the alternative station and whether that time is before the vehicle leaves the alternative station.

In decision block 510, the central module determines whether any feasible alternative travel plans have been found. If so (decision block 510: yes), in block 512 the central module includes those plans in an alternative travel advisory and sends the advisory to the commuter. In some embodiments, if more than one feasible alternative travel plans are found, they are sorted according to various criteria that include their ETA, their matching the commuter's preferences, or both. In some embodiments, the alternative travel advisory includes, for each plan, some details of the plan, which may include the estimated time to reach the alternative station, the distance to the alternative station, the means to get to that station (such as on foot, by taxi, or by another public transport vehicle), the time that the alternative plan can get the commuter to the destination (ETA of the plan), or the type of the public transport vehicle included in the plan. In some embodiments, an alternative travel plan may include switching from one public transport vehicle to one or more other public transport vehicles to reach the destination.

In some embodiments, once the central module finds some feasible alternative plans, it stops the process and reports those plans to the commuter. In some embodiments, the central module continues searching for more plans if no feasible plans are found, if the found plans include high risk options (i.e., options that the commuter is unlikely to reach on time), or if the found plans do not match some or all of the commuter's preferences (such as ETA or vehicle type). In these cases (decision block 510: No), the central module goes back to block 504 to identify additional alternative stations not considered before and to then repeat blocks 506 and 508.

To identify additional alternative stations, the central module may find a new station by back tracking or forward tracking. The central station may proceed to back track further from a station that was previously found by back tracking, or forward track further from a station that was previously found by forward tracking. In some embodiments, if no other alternative stations can be found, the central module may send an alert to the commuter, indicating that no alternative travel plan have been found.

Applying these mechanisms to the above scenarios related to P1 and P2, after identifying the list of busses reaching S4, the central module may first discard all options along route R4, since route R4 has been blocked. Also, the central module may discard, or assign low priorities to, those busses that reach S4 at a time that is close to the alert time, 10:20, because the commuter may not be able to reach S4 in time to catch those busses. Alternatively, the central module may estimate the time that the commuter will need to reach S4 and consider that factor in assigning priorities or risk factors to an option. Of the above-identified available busses at S4, for example, the central module may discard or assign a high risk of being missed to the first bus on route R1, which reaches S4 at 10:30.

Moreover, the central module may only consider bus options that can get the commuter to the commuter's destination on time. For example, P1 wants to reach station S13 by an ETA of 12:42. All routes reach station S13, and therefore, all can be considered for P1. Moreover, of the remaining options, the first and second busses of R1 and the second bus of R2 reach S13 at 11:15, 12:15, 12:05, respectively, all of which are before 12:42. These busses, therefore, may provide feasible alternative travel plans for P1. The central module may further lower the priority of the R2 bus because that bus does not fit the preferences of P1. For example, P1 may have chosen a comfortable ride, while the second bus of R2 does not fit that criterion. The central module, thus, may send to P1 three alternative travel plans which include, in order, the second bus of R1, the second bus of R2, and the first bus of R1, reaching station S4 at 11:30, 10:45, and 10:30, respectively.

Applying the same mechanism to P2, none of the remaining options at S4 offer a feasible travel plan for P2. In particular, P2 intends to reach S12 with an ETA of 13:30. The remaining options at S4, however, include routes R1 and R2, none of which reach S12. The central module, therefore, may move back to block 504, and identify another alternative station. In particular, in one embodiment, the central module may backtrack further from station S4 along route R4 and thus identify station S2 as an alternative station. Alternatively, the central module may forward track from location 602 or station S4 and identify, for example, one or more of stations S6, S7, S8, or S10, as the next alternative station. In some embodiments, the central module may select one of these options as the next alternative station based on, for example, its distance to location 602, or its being located along one or more routes that reach the commuter's destination.

Assuming that the central module selects S2 as the next alternative station, the central module then performs blocks 506 and 508 to identify available routes, vehicle options, and feasible travel plans. In this case, because P2 wants to reach S12, only routes R4 and R5 are considered, because they are the only routes that reach S12. Moreover, because route R4 is blocked, the central station may only consider options along route R5, which also crosses the alternative station S2. Using timetable 650 (FIG. 6B), the central module determines that of route R5 busses, the first to fourth busses reach station S2 at 10:25, 10:45, 10:55, and 11:15, respectively. Assuming that the central module performs these calculations shortly after receiving the alert at 10:20, and assuming that it will take the commuter at least 30 minutes to reach station S2 from location 602, the commuter can reach station S2 around 10:50. The central module, therefore, discards the first and second busses along R5, which will reach and leave station S2 before 10:50. Moreover, the third bus reaches S2 at 10:55, which is very close to 10:50. Thus the central module may assign to the third bus a higher risk that it may be missed.

The central module, therefore, may present an alternative travel advisory to P2 which includes going back to station S2 and taking either the third bus (with higher risk of missing) or the fourth bus (lower risk) which arrive at S2 at 10:55 and 11:15, respectively. These busses reach station S12, the destination P2, at 13:25 and 13:45, respectively. Because P2's ETA to reach S12 is 13:30, the alternative advisory plan may also alert P2 that if P2 uses the fourth bus, P2 may miss the ETA.

Because the first found alternative above carries a high risk of being missed by P2 and the second one does not match the ETA of P2, the central module may continue to look for alternative stations and alternative plans. In particular, as the only available options are along route R5, the central module may consider forward tracking from location 602 to select station S10 as an alternative station. Moreover, based on the time that it will take P2 to reach S10, the central module may find feasible bus options along R5, which P2 can catch at S10 and which will arrive at S12 at a time that matches the ETA of P2.

In various embodiments, to accelerate the process of finding a feasible alternative plan, the central module may apply some conditions upfront to narrow the possible set of options before proceeding to consider the details of each option. In particular, the central module may first determine routes that include the commuter's destination and in its determinations only consider those routes and stations that are along those routes. Moreover, in its determinations, the commuter may discard all routes that are blocked or delayed by a disruption.

For example, in the above scenario for P2, the central module may only consider routes R4 and R5, because these are the only routes that reach P2's destination, S12. Further, of these two routes, the central module may discard route R4 as an option, as it is blocked. Then, in selecting an alternative station, the central module can only consider stations that are along the only remaining route option, that is, R5. Similarly, in considering the bus options, the central module may discard or delay considering bus options that do not fit the commuter's preferences, such as bus type or ETA, or are at a high risk that they will be missed.

In some embodiments, after the system sends the commuter alternative travel advisories, the system may verify whether the commuter follows any of the travel advisories. In particular, in some embodiment, the commuter may accept one of the advisories on the screen of the commuter module. In some embodiments, the commuter does so by actuating a button next to the corresponding alternative travel plan. In some embodiments, the system determines the commuter's choice by locating the commuter in a vehicle corresponding to a travel advisory plan.

In various embodiments, the foregoing methods are applied to public transport modes that include a pre-determined route or a changeable route. A public transport mode with a pre-determined route may include a train, a bus with a fixed route, or a public ferry with a fixed route. A public transport mode with a changeable route may include a taxi, or a bus or ferry which can take a detour from its pre-determined route. In various embodiments, the above-discussed methods using a public transport map or schedule are applied to public transport modes with pre-determined routes. In some embodiments, the above-discussed methods further include options for using modes with changeable routes.

As noted above, in some embodiments, one or more of modules disclosed in this disclosure are implemented via one or more computer processors executing software programs for performing the functionality of the corresponding modules. In some embodiments, one or more of the disclosed modules are implemented via one or more hardware modules executing firmware for performing the functionality of the corresponding modules. In various embodiments, one or more of the disclosed modules include storage media for storing data used by the module, or software or firmware programs executed by the module. In various embodiments, one or more of the disclosed modules or disclosed storage media are internal or external to the disclosed systems. In some embodiments, one or more of the disclosed modules or storage media are implemented via a computing "cloud", to which the disclosed system connects via a network connection and accordingly uses the external module or storage medium. In some embodiments, the disclosed storage media for storing information include non-transitory computer-readable media, such as a CD-ROM, a computer storage, e.g., a hard disk, or a flash memory. Further, in various embodiments, one or more of the storage media are non-transitory computer-readable media for storing information or software programs executed by various modules or implementing various methods or flow charts disclosed herein.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not described in the embodiments. Accordingly, the invention is not limited to the above-described embodiments, but instead is defined by the appended claims in light of their full scope of equivalents.

The invention claimed is:

1. A method for managing a public transport system, the method comprising:
   receiving, by a receiver module implemented at least partially in hardware, information indicating a change of status for a component of the public transport system;
   identifying, by a locator module implemented at least partially in hardware, a commuter who is affected by the change of status;
   generating, by an alternative travel advisory module implemented at least partially in hardware, an alternative travel advisory for the commuter based on the change of status; and
   transmitting, by a transmitter module implemented at least partially in hardware, the alternative travel advisory to the commuter.

2. The method of claim 1, wherein:
   the change of status includes a delay in an expected time of arrival of a public transport vehicle;
   identifying the commuter includes locating the commuter in the public transport vehicle; and
   the alternative travel advisory includes a message advising the commuter to leave the public transport vehicle.

3. The method of claim 2, further comprising:
   receiving, from the commuter, information indicating that the commuter has boarded the public transport vehicle, wherein locating the commuter in the public transport vehicle is based on the information indicating that the commuter has boarded the public transport vehicle.

4. The method of claim 2, further comprising:
   tracking a location of the commuter; and
   tracking a location of the public transport vehicle, wherein locating the commuter in the public transport vehicle is based on comparing the location of the commuter with the location of the public transport vehicle.

5. The method of claim 1, wherein:
   the commuter is located in a first public transport vehicle, and
   the alternative travel advisory includes advising the commuter to leave the first public transport vehicle and board a second public transport vehicle.

6. The method of claim 1, wherein:
   the change of status comprises a delay in an expected time of arrival of a first public transport vehicle boarded by the commuter,
   the information indicating the change of status is received from at least one of an operator of the first public transport vehicle or an operator of a second public transport vehicle, and
   the second public transport vehicle is different from the first public transport vehicle.

7. The method of claim 1, wherein generating the alternative travel advisory comprises:
   generating the alternative travel advisory for the commuter based on the change of status and based on at least one of an expected time of arrival for the commuter or a preference of the commuter.

8. The method of claim 1, wherein:
   the change of status includes a traffic disruption, and
   identifying the commuter includes determining that the commuter has boarded a public transport vehicle for which a schedule is affected by the traffic disruption.

9. The method of claim 1, wherein generating the alternative travel advisory comprises using a look-up table for a plurality of public transport vehicles.

10. The method of claim 9, wherein:
    the change of status includes a traffic disruption; and
    generating the alternative travel advisory comprises identifying an alternative public transport vehicle, of the plurality of public transport vehicles, for which a schedule is not affected by the traffic disruption.

11. The method of claim 10, wherein identifying the alternative public transport vehicle comprises determining that the alternative public transport vehicle has a stop located within a pre-determined distance from a location of the commuter.

12. The method of claim 11, wherein identifying the alternative public transport vehicle further comprises determining that the alternative public transport vehicle has a second stop within a second pre-determined distance from a destination of the commuter.

13. The method of claim 1, wherein transmitting the alternative travel advisory comprises transmitting the alternative travel advisory to a mobile device.

14. The method of claim 1, wherein the alternative travel advisory comprises a message identifying a preferred option for reaching a destination of the commuter and a second option for reaching the destination.

15. The method of claim 1, wherein the alternative travel advisory comprises an identification of a travel route that originates at a present location of the commuter and ends at a destination of the commuter.

16. The method of claim 1, wherein the alternative travel advisory comprises a message directing the commuter to walk to a public transport stop and board a public transport vehicle at the public transport stop.

17. The method of claim 1, wherein the alternative travel advisory includes an advertisement.

18. The method of claim 17, wherein the advertisement is based in part on one or more of a location of the commuter, a time of the transmitting the alternative travel advisory, a context of a commute of the commuter, or a preference of the commuter.

19. The method of claim 1, further comprising:
transmitting the alternative travel advisory to a driver module or to a central module.

20. The method of claim 1, wherein the change of status includes a change in a number of available seats in a public transport vehicle.

21. The method of claim 20, wherein receiving information indicating the change of status comprises:
receiving information indicating the change in the number of available seats from an operator of the public transport vehicle.

22. A system including:
an apparatus to:
receive information indicating a change of status of a component of a public transport system;
identify a commuter who is affected by the change of status;
generate an alternative travel advisory for the commuter based on the change of status; and
transmit the alternative travel advisory to the commuter.

23. The system of claim 22, where the alternative travel advisory includes advice for the commuter to leave a first public transport vehicle and board a second public transport vehicle.

24. A non-transitory computer-readable medium storing instructions, the instructions comprising:
one or more instructions which, when executed by one or more processors, cause the one or more processors to:
receive information indicating a change of status of a component of a public transport system;
identify a commuter who is affected by the change of status;
generate an alternative travel advisory for the commuter based on the change of status; and
transmit the alternative travel advisory to the commuter.

25. An apparatus comprising:
one or more processors to:
receive a driver-input from a driver of a vehicle of a public transport system;
determine a change of status for a component of the public transport system based on the driver-input;
generate an alert based on the change of status; and
transmit the alert to a module of the public transport system.

26. The apparatus of claim 25, wherein the change of status includes a change in a number of available seats in the public transport vehicle of the public transport system.

27. The apparatus of claim 26,
wherein the vehicle is a first vehicle,
wherein the change in the number of available seats indicates that the first vehicle is overcrowded, and
wherein the alert causes the public transport system to allocate a second vehicle to a transport route of the first vehicle.

28. The apparatus of claim 26,
wherein the vehicle is a first vehicle,
wherein the change in the number of available seats indicates that the first vehicle is underused, and
wherein the alert causes the public transport system to de-allocate a second vehicle from a transport route of the first vehicle.

29. The apparatus of claim 25, wherein the change of status includes a delay in an expected time of arrival of the vehicle.

30. The apparatus of claim 25, wherein the change of status includes a traffic disruption.

31. The apparatus of claim 25, wherein the module is a central module or a commuter module.

32. The apparatus of claim 25,
wherein the one or more processors are further to:
receive driver-information, and
provide, for display, the driver-information to the driver, and
wherein the driver-information includes one or more of:
information about a number of commuters waiting at an upcoming stop, or
information about a number of seats available in a preceding vehicle.

33. An apparatus comprising:
one or more processors to:
transmit commuter information, to a public transport system, that indicates that a commuter boarded a public transport vehicle of a public transport system;
receive, based on transmitting the commuter information, a message from the public transport system;
determine, based on the message, information about a status of the public transport system; and
provide, for display, the information about the status of the public transport system.

34. The apparatus of claim 33, wherein the message includes an alternative travel advisory for the commuter.

35. The apparatus of claim 34,
wherein the alternative travel advisory is in response to a change of status for a component of the public transport system, and
wherein the change of status affects the commuter.

36. The apparatus of claim 33, wherein the message includes a section of a map of the public transport system or a schedule of the public transport system.

37. The apparatus of claim 33, wherein the message includes an indication of a number of available seats in a public transport vehicle.

38. The apparatus of claim 33, wherein the message includes an advertisement.

39. A method for managing a public transport system, the method comprising:
receiving, by a receiver module of at least one device, information indicating locations of a plurality of commuters;

determining, by a locator module of the at least one device, a quantity of particular commuters, of the plurality of commuters, that are located at one location of the locations; and providing, by the at least one device and to a driver module, information based on the quantity of the particular commuters.

40. The method of claim 39,
wherein the one location is inside a public transport vehicle, and
wherein determining the quantity of the particular commuters includes:
  determining the quantity of the particular commuters who boarded the public transport vehicle.

41. The method of claim 39,
wherein the one location is a location of a public transport stop, and
wherein determining the quantity of the particular commuters includes:
  determining the quantity of the particular commuters at the stop.

42. The method of claim 39,
wherein the one location is a location of a public transport stop, and
wherein determining the quantity of the particular commuters includes:
  determining the quantity of the particular commuters waiting at the stop to board a public transport vehicle along a specific public transport route.

43. The method of claim 39, wherein the driver module is configured to be used by a driver of a public transport vehicle.

* * * * *